United States Patent [19]
Moskowitz et al.

[11] Patent Number: 5,629,732
[45] Date of Patent: May 13, 1997

[54] VIEWER CONTROLLABLE ON-DEMAND MULTIMEDIA SERVICE

[75] Inventors: Alan S. Moskowitz, Weston, Conn.; Michael Rizkalla, Pleasantville, N.Y.

[73] Assignee: The Trustees of Columbia University in the City of New York

[21] Appl. No.: 219,670

[22] Filed: Mar. 29, 1994

[51] Int. Cl.⁶ .................................................. H04N 7/173
[52] U.S. Cl. .................................. 348/7; 348/13; 455/4.2
[58] Field of Search .................................. 348/7, 12, 13; 455/4.2, 5.1, 6.1; H04N 7/16, 7/173

[56] References Cited

U.S. PATENT DOCUMENTS

| | | |
|---|---|---|
| 4,506,387 | 3/1985 | Walter . |
| 5,168,353 | 12/1992 | Walker et al. ............................. 348/6 |
| 5,172,413 | 12/1992 | Bradley et al. ........................... 348/7 |
| 5,339,315 | 8/1994 | Maeda et al. ............................. 348/7 |
| 5,357,276 | 10/1994 | Banker et al. ............................ 348/7 |
| 5,371,532 | 12/1994 | Gelman et al. ........................... 348/7 |
| 5,414,455 | 5/1995 | Hooper et al. ............................ 348/7 |
| 5,416,508 | 5/1995 | Sakuma et al. ........................... 348/7 |
| 5,453,779 | 9/1995 | Dan et al. ................................. 348/7 |
| 5,461,415 | 10/1995 | Wolf et al. ............................... 348/7 |
| 5,477,263 | 12/1995 | O'Callaghan et al. ................. 455/4.2 |

OTHER PUBLICATIONS

Peter Newman "ATM Technology for Corporate Networks" IEEE Communications Magazine Apr. 1992 pp. 90–101.
W. D. Sincoskie, "System architecture for a large scale video on demand service", 1991, pp. 155–162.
T. Gillette et al., "Method for Providing Video Programming Nearly on Demand," *PCT Publication*, WO 92/11713, Jul. 9, 1992.
H. Vin et al., "Designing a Multi–User HDTV Storage Server," *IEEE Journal on Selected Areas in Communications*, Jan. 1993, vol. 11, No. 1.
P. Rangan et al., "Designing an On–Demand Multimedia Service," *IEEE Communications Magazine*, Jul. 1992, vol. 30, No. 7, pp. 56–64.
L. Litteral et al., "PSTN Architecture for Video–On–Demand Services," *PCT Publication*, WO 93/06693, Apr. 1, 1993.
C. Judice, "Entertainment Video–On–Demand at T1 Transmission Speeds (1.5 Mb/s)," *Proceedings of the SPIE–Visual Communications and Image Processing '88*, Nov. 1988, vol. 1001, Pt. 1, pp. 396–397.

*Primary Examiner*—John K. Peng
*Assistant Examiner*—Chris Grant
*Attorney, Agent, or Firm*—Brumbaugh, Graves, Donohue & Raymond

[57] ABSTRACT

In a multimedia application where movie events are distributed on an on-demand basis, a multimedia server serves a subscriber requesting a movie event through either a high-demand process or a low-demand process. In a low demand process, a data stream representative of the movie is exclusively provided to the subscriber in accordance with a double-buffering technique. The server may switch many low-demand processes serving the same movie event into a high-demand process to effectively utilize limited resources. In the high-demand process, high-demand pointers are launched periodically and are associated with data streams representative of the movie event having different start times. Each data stream associated with a high-demand pointer may be shared by an unlimited number of subscribers. Service alterations of the movie including fast-forwarding, rewinding, and restarting after a pause are achieved by way pointer-hopping.

78 Claims, 23 Drawing Sheets

2a

| EVENT | # LOW-DEMAND PROCESSES |
|---|---|
| A | M−5 |
| B | 2 |
| C | 3 |
| D | 0 |

X = M

2b

| EVENT | # LOW-DEMAND PROCESSES |
|---|---|
| A | M−9 |
| E | 2 |
| F | 2 |
| G | 1 |

X = M−4

2f

| EVENT | # LOW-DEMAND PROCESSES |
|---|---|
| A | M−7 |
| B | 1 |
| H | 1 |
| T | 1 |

| EVENT | # LOW-DEMAND PROCESSES |
|---|---|
| A | M−7 |
| B | 2 |
| C | 3 |
| D | 1 |

X = M−1

2b

| EVENT | # LOW-DEMAND PROCESSES |
|---|---|
| A | M−7 |
| E | 2 |
| F | 2 |
| G | 1 |

X = M−2

2f

| EVENT | # LOW-DEMAND PROCESSES |
|---|---|
| A | M−7 |
| B | 1 |
| H | 1 |
| T | 1 |

| | 2a | | | 2b | | | 2f |
|---|---|---|---|---|---|---|---|

| EVENT | # LOW-DEMAND PROCESSES |
|---|---|
| A | M−5 |
| B | 2 |
| C | 3 |
| D | 0 |

X = M

| EVENT | # LOW-DEMAND PROCESSES |
|---|---|
| A | M−9 |
| E | 2 |
| F | 3 |
| G | 4 |

X = M

| EVENT | # LOW-DEMAND PROCESSES |
|---|---|
| A | M−7 |
| B | 1 |
| H | 4 |
| T | 2 |

| EVENT | # LOW-DEMAND PROCESSES |
|---|---|
| A | 0 |
| B | 2 |
| C | 3 |
| D | 0 |

X = 5

| EVENT | # LOW-DEMAND PROCESSES |
|---|---|
| A | 0 |
| E | 2 |
| F | 3 |
| G | 4 |

X = 9

| EVENT | # LOW-DEMAND PROCESSES |
|---|---|
| A | 0 |
| B | 1 |
| H | 4 |
| T | 2 |

X = 7

55

| Index Number 551 (I) | Base Memory Address 553 | Memory Offset Field 555 | | | | |
|---|---|---|---|---|---|---|
| | | 1 | 2 | 3 | 4 | N |
| 0 | 0 | 80 | 190 | | | |
| 1 | | | | | | |
| 2 | 15000000 | | | 425 | 550 | |
| ... | | | | | | |
| S | | | | | | |

| Table of Contents Index 571 | Memory Offset Index 573 | Connection Identifier 575 |
|---|---|---|
| | | |
| | | |
| | | |
| | | |
| ⋮ | ⋮ | ⋮ |
| | | |

FIG. 15

58      CURRENT TIME 20:00:15

| Connection Identifier 580 | # Subscribers 583 | Start Time 585 |
|---|---|---|
| | | 20:00:30 |
| | | 20:00:00 |
| NULL | 0 | 19:59:30 |
| | | |
| ⋮ | ⋮ | ⋮ |
| | | 18:00:30 |

VIEWER CONTROLLABLE ON-DEMAND MULTIMEDIA SERVICE

The U.S. Government has certain rights in this invention pursuant to award CDR-881111 by the National Science Foundation.

TECHNICAL FIELD

This invention relates to multimedia technology and in particular to a technique for providing interactive, on-demand multimedia services, such as movie distribution, home shopping, news dissemination, etc.

BACKGROUND OF THE INVENTION

The explosion of digital technology has sparked rapid growth in multimedia applications merging audio, video and text information. One such application, which is fervently pursued by the cable television industry, involves distribution of cable services such as movies on an on-demand basis.

Currently, the most common service for providing on-demand movies to subscribers is known as the "pay-per-view" service. In accordance with this service, a cable television provider repeatedly plays a movie on a specified channel throughout the day. The show times of the movie are predetermined and approximately two hours apart as a movie is normally two hours long. Based on a known schedule, subscribers may order a movie showing by way of telephone requests.

Another technique for offering on-demand movies which embraces a "nearly on-demand" concept is disclosed in: T. Gillette et al., "Method for Providing Video Programming Nearly on Demand," *PCT Publication*, WO 92/11713, Jul. 9, 1992. In accordance with this technique, a service provider operates multiple channels which play the same movie on a time offset basis. Through one of these channels, a subscriber is able to view the movie from its beginning at any time by waiting for a period no longer than the offset. For example, if five channels are used, the offset may be set to be 24 minutes. Thus, the wait time for the movie on average is appreciably reduced. On the other hand, the total number of channels used per movie is undesirably increased. Like the pay-per-view service, this technique requires subscribers to request by phone a movie showing.

The above two techniques both suffer a number of drawbacks. One such drawback is unduly limiting the subscribers' choice as the subscribers have to view whatever movies the service provider offers. In addition, the subscribers have to view the movies at the times specified by the service provider. As a result, the subscribers generally need to wait for some significant time before a movie starts.

Thus, the prior art services are technically lacking with respect to a "truly" on-demand multimedia service whereby a subscriber is allowed to choose from a large selection of movies and to view the selected movie instantaneously.

The current multimedia technology may rely on the latest network developments in such areas as asynchronous transfer mode (ATM) communications and optical fiber networks to provide high speed transmission facilities. It however is deficient in the design of a multimedia server capable of delivering multimedia information to virtually any number of subscribers at any given time in an interactive manner. For example, in a truly on-demand multimedia movie service, the interactive capability should allow a subscriber to communicate his/her requests for such video cassette recorder (VCR) functions as rewinding, fast-forwarding, pausing, etc. In home shopping a subscriber should be able to enter purchase orders while the home shopping program is on. Thus, a desirable multimedia server, which has not been achieved in prior art, has to afford two-way communications to and from subscribers, and the capability of routing a wide range of application specific requests and acting on such requests promptly.

The desirable multimedia server must also be capable of handling multiple users simultaneously. For example, with the multimedia server, the service for thousands of people simultaneously accessing a feature movie should be no different from that for two people viewing the same news clip. Due to the real-time aspect of multimedia information, it is necessary to minimize delays caused by excessive service requests at any given time. The desirable multimedia server must ensure continuous and synchronized retrieval of multiple data streams at varying data rates. For example, in quality video broadcast, the video must be transmitted at thirty frames per second. Moreover, the desirable multimedia server should also allow random access to any part of a multimedia event, for example, the last quarter of a football game show which may be of particular interest.

SUMMARY OF THE INVENTION

The present invention overcomes the prior art limitations and satisfies all the above requirements of a desirable multimedia server. In accordance with the invention, the multimedia server contains a memory for storing a multiplicity of data groups at different memory locations. These data groups are representative of a selected multimedia event, for example, a particular movie event. The server is capable of providing data streams, each of which is representative of the selected event starting at a different time. The server also generates a multiplicity of pointers. Each pointer is associated with a different data stream, and indicates memory locations where data groups are retrieved to form the data stream associated therewith.

Advantageously, the inventive server is capable of serving the selected multimedia event to a virtually unlimited number of subscribers. Each subscriber may individually interact with the server to request VCR functions such as fast-forwarding, rewinding, pausing, and restarting after a pause of the selected multimedia event.

BRIEF DESCRIPTION OF THE DRAWING

Further objects, features and advantages of the invention will become apparent from the following detailed description taken in conjunction with the accompanying drawing showing a preferred embodiment of the invention, in which:

FIGS. 3A and 3B respectively demonstrate in a first scenario the statuses of storage devices before and after equalization in accordance with the invention;

FIGS. 4A and 4B respectively demonstrate in a second scenario the statuses of storage devices before and after equalization in accordance with the invention;

FIG. 13 is a first one of the four tables of FIG. 12;

FIG. 15 is a third one of the four tables of FIG. 12;

FIG. 16 is a fourth one of the four tables of FIG. 12;

Throughout the figures of the drawing, the same reference numerals and characters are used to denote like features, elements, components or portions of the illustrated embodiment.

DETAILED DESCRIPTION

Figure 1:
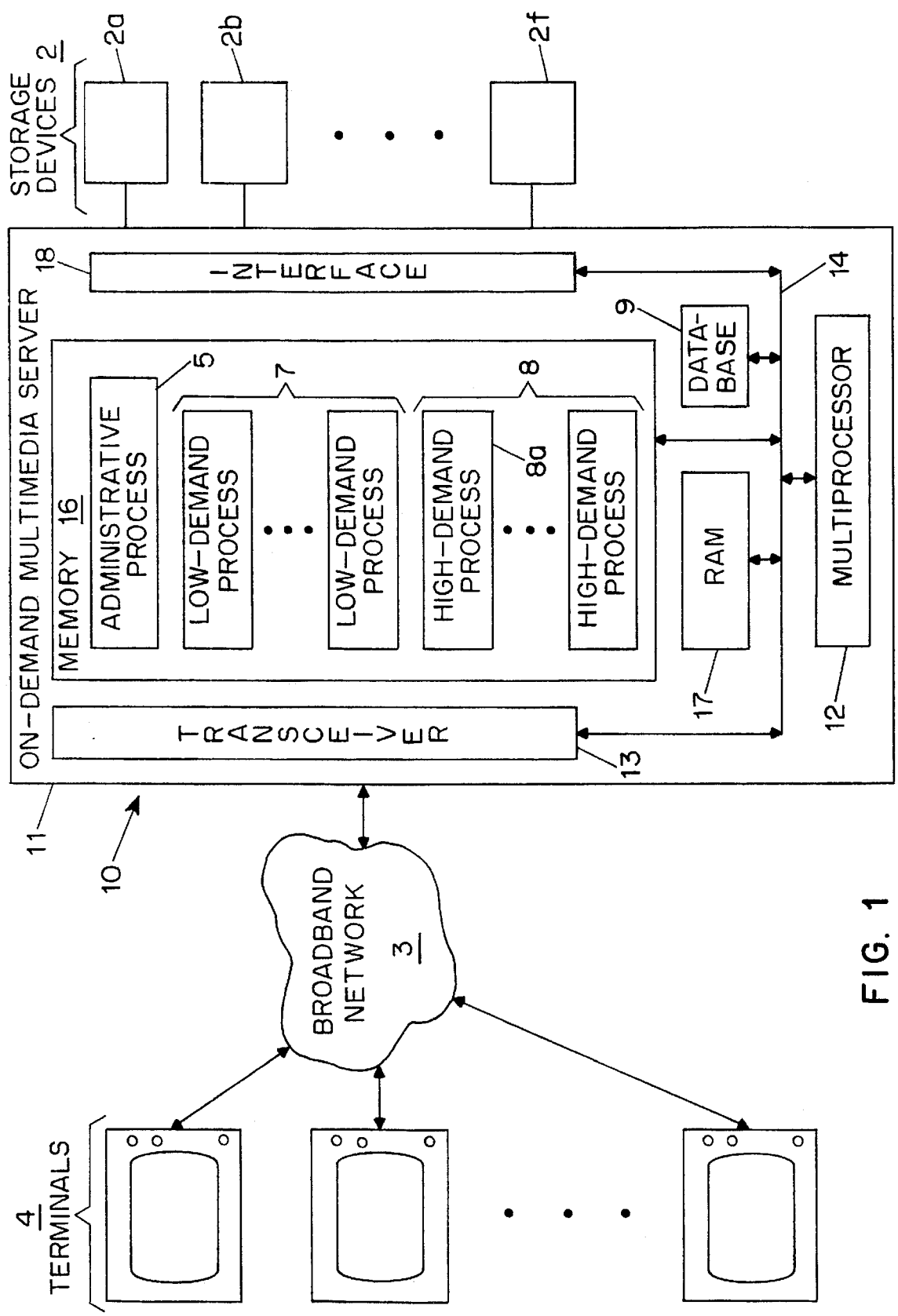
FIG. 1 is a block diagram of a multimedia system in accordance with the invention.

FIG. 1 illustrates multimedia system 10 embodying the principles of the invention. Multimedia system 10 can be used for many different multimedia applications including home shopping, news dissemination, etc. In this particular embodiment, system 10 is illustratively used for distributing movies to subscribers on an on-demand basis.

Central to system 10 is on-demand multimedia server 11 comprising a massively parallel computer of the type of a Silicon Graphics® ONYX Rack System manufactured by Silicon Graphics, Inc., 2011 North Shoreline Blvd., Mountain View, Calif. 94043. Server 11 includes random-access memory (RAM) 17 having a capacity on the order of $10^3$ Mbytes and internal bus 14 capable of transporting data at a speed on the order of Gbytes/s, thereby allowing many multimedia movie events to be processed simultaneously.

Transceiver 13 in server 11 is connected to a multiplicity of terminals 4 through standard broadband network 3, or other broadband networks including the information superhighway in years to come. In this illustrative embodiment, the communications between server 11 and terminals 4 are in a asynchronous transfer mode (ATM) which is well-known in the art. To this end, transceiver 13 is realized here using a VMA-100 ATM adaptor card manufactured by Fore Systems, Inc., 1000 Gamma Drive, Suite 504, Pittsburg, Pa. 15238-2940. Each of terminals 4 is realized using a standard Sun SPARC Station manufactured by Sun Microsystems, Inc., which incorporates a SBA-200 ATM Adaptor Card manufactured by Fore Systems, Inc. With this arrangement, each terminal is capable of receiving multimedia data including video and audio data transmitted from transceiver 13 and communicating with server 11 to request therefrom different services. These services include provision of a movie event to the terminal, alteration of a current service including fast-forwarding, rewinding, pausing and restarting after pausing.

In this particular illustrative embodiment, server 11 is also connected through standard interface 18 to eight storage devices 2 including devices 2a through 2f. Each storage device is of the type of a Silicon Graphics® 2.0 Gbytes disk drive manufactured by Silicon Graphics, Inc. The device is capable of storing compressed multimedia data representative of eight to ten movies. Depending on the popularity of a particular movie, two or more of storage devices 2 may contain the same movie to support a large audience. In order to ensure data availability during transmission, each storage device allows for data access at a throughput speed higher than the transmission rate. In this particular illustrative embodiment, the throughput speed and the transmission rate are about 150 Mb/s and 100 Mb/s, respectively.

Memory 16 within server 11 stores a number of different programs or processes for multiprocessor 12 to run. In this particular embodiment, multiprocessor 12 comprises eight 64-bit processors. Instructed by these processes, multiprocessor 12 performs movie distribution on an on-demand basis in accordance with the invention. As shown in FIG. 1, the stored processes include administrative process 5, low-demand processes 7 and high-demand processes 8. Server 11 also comprises relational database 9 of the type of Sybase® SQL Server software manufactured by Sybase, Inc., 6390 Christie Ave., Emeryville, Calif. 94608. Database 9 contains necessary data for multiprocessor 12 to run the multimedia application. Such data includes titles of the movies available for subscription, the lengths of the movies, the file locations of the movies in storage devices 2, network connection information, etc.

In accordance with the invention, server 11 is designed based on a differentiation of low-demand events from high-demand events. For a low-demand event which is requested by a small number of subscribers, each subscriber is serviced by a different one of low-demand processes 7. The latter calls for retrieving a copy of the event in portions from storage devices 2, buffering the retrieved data in RAM 17, and transmitting the buffered data to the subscriber, in accordance with a double-buffering technique to be described. This being so, a low-demand process continually engages a storage device to periodically retrieve the multimedia data therefrom.

A large section of RAM 17 is reserved for data buffers used in low-demand processes 7. For each low-demand process, a pair of buffers in RAM 17 is configured as a double buffer. Storage devices 2 connected to server 11 writes multimedia data to one of the buffer-pair while the data in the other buffer is being transmitted to network 3. The roles of the two buffers alternate as the low-demand process transpires. The data stream, thus generated, is dedicated to the subscriber serviced by the low-demand process. By controlling the flow of the dedicated stream, the subscriber can effect any types of service alterations such as fast-forwarding, rewinding and pausing of the movie event.

A high-demand event is requested by substantially more subscribers than a low-demand event, and is served by one of high-demand processes 8. A high-demand process is realized by loading a copy of the entire multimedia event into RAM 17. The high-demand event data is provided to the subscribers in accordance with a pointer-hopping technique. Specifically, once the entire event is loaded in RAM 17, video pointers are launched at periodic time intervals. Each pointer represents a data stream and continuously traverses the RAM section where the multimedia data is stored. A subscriber serviced by a data stream associated with a particular pointer may fast-forward the event by hopping on pointers previously launched, rewind by hopping on upcoming pointers, and restart after a still frame or a pause by hopping on the pointer associated with the data stream representative of the balance of the event. The above pointer-hopping technique is further described hereinbelow.

A high-demand process is designed based upon the inventive notion that the flow of a data stream need not be disturbed despite service alterations so that many subscribers can share the same data stream. Indeed, unlike a low-demand process, the flow of a data stream in a high-demand process incorporating the above pointer-hopping technique is unaffected despite the service alterations. This being so, each data stream in the high-demand process can be shared by a virtually unlimited number of subscribers.

It should also be noted that, unlike a low-demand process, a high-demand process does not engage any storage device for data retrieval during the playing of a high-demand event as the entire event is loaded into RAM 17 ab initio.

Thus, upon a request by a subscriber for an event, server 11 first needs to determine whether the requested event should be served by a low-demand process or high-demand process. An apparent determination is that if the requested event is currently in a high-demand status such an event remains to be served by the existing high-demand process. Otherwise, the addition of a new subscriber presumably calls for another low-demand process. Server 11 then needs to determine whether the additional low-demand process would overload system 10. If system 10 should be overloaded, a new high-demand process is created through an inventive switch-on-the-fly operation to be described.

Each of storage devices 2 can support only a limited number of low-demand processes due to its limited throughput speed. In this embodiment, each movie event is transmitted by server 11 at a rate of 1.5 Mb/s. Thus, each low-demand event requires a data retrieval rate of same. Since the throughput speed of a storage device in this instance is about 150 Mb/s, the storage device becomes saturated and cannot support additional low-demand processes once the number of the processes it handles reaches above 100. In accordance with an aspect of the invention, a storage-smoothing technique is applied to alleviate the saturation, if any.

Figure 2:
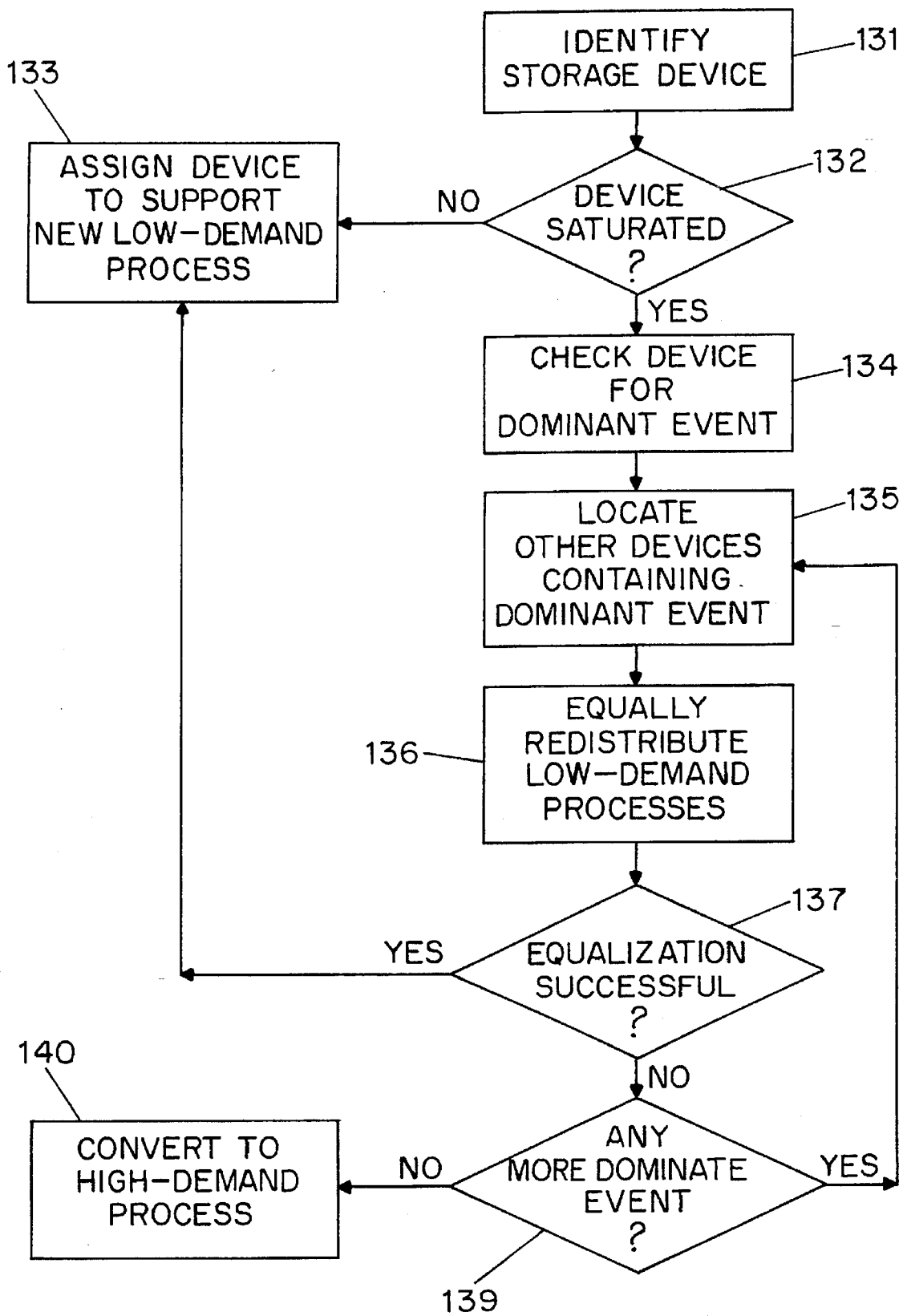
FIG. 2 is a flow chart depicting the steps for establishing a low-demand process in accordance with the invention.

Referring to FIG. 2, during the set-up of a new low-demand process, database 9 is searched for the file location of the requested movie event. One of storage devices 2 is then identified which contains the requested movie event and which supports the fewest low-demand processes, as indicated at step 131. At step 132, the identified storage device is checked for saturation. If the identified storage device is not yet saturated, the device is assigned to also support the new low-demand process, and the latter may proceed to retrieve data from this storage device, as indicated at step 133. Otherwise, the above storage smoothing technique is applied. In accordance with this technique, the identified storage device is checked within itself for a dominant event, say event A, which is currently accessed by the highest number of low-demand processes, as indicated at step 134. At step 135, other storage devices containing event A are located. All low-demand processes accessing event A are equally redistributed among all the storage devices containing such an event, as indicated at step 136. This redistribution is referred to as "equalization". The success of the equalization is checked for at step 137 as equalization may fail if all other storage devices containing event A are saturated. If the equalization is successful, i.e., the originally identified storage device being unsaturated, it is then assigned to also support the new low-demand process, as indicated at step 133. Otherwise if the equalization fails, the identified storage device is checked for a new dominant event which is currently accessed by the next highest number of low-demand processes, as indicated at step 139. If a new dominant event exists, the aforementioned step 135 is revisited. Otherwise if no more dominant event is identified for equalization, all low-demand processes serving the original dominant event are converted at step 140 to a high-demand process. Thus, if the requested event coincides with the original dominant event, the new low-demand process is also merged into the high-demand process. The above conversion of a subset of low-demand processes to a high-demand process desirably disengages the storage device from retrieving data therefor, thereby freeing the storage device to accommodate additional new low-demand processes.

FIGS. 3A and 3B demonstrates a scenario where the equalization operation would succeed. FIG. 3A illustrates the statuses of storage devices 2a, 2b and 2f (which are particularly relevant in this scenario) before a new low-demand process attempts to access event D for example. In this scenario, of all storage devices 2, device 2a is the only device in which event D is stored. However, device 2a is saturated because the total number (X) of low-demand processes supported thereby is equal to M, the maximum number which can be supported by a storage device. The dominant event for storage device 2a is event A as the most number of low-demand processes access it. As shown in FIG. 3A, device 2a supports M-5 processes of event A; device 2b supports M-9 processes of event A; and device 2f supports M-7 processes of event A.

FIG. 3B shows the statuses of storage devices 2a, 2b and 2f after successful equalization, the number of processes accessing event A is equalized to be M-7 in each of the three devices, allowing storage device 2a to become unsaturated. As such, device 2a can support the additional low-demand process accessing event D.

FIGS. 4A and 4B demonstrate another scenario where the equalization operation would fail. FIG. 4A illustrates the initial statuses of devices 2a, 2b and 2f which are the only devices containing event A. In this scenario a new low-demand process attempts to access event A, instead. However, all the storage devices which contain event A are saturated (i.e. X=M). An attempt to perform the equalization would fail due to the inability to redistribute any low-demand processes accessing event A. As a result, server 11 has no choice but to perform the switching-on-the-fly operation to convert the low-demand processes serving dominant event A to a high-demand process. FIG. 4b illustrates the statuses of storage devices 2a, 2b and 2f after the conversion takes place.

As discussed above, the switch-on-the-fly operation may be triggered when some of storage devices 2 become saturated. Such an operation may also be triggered in server 11 when the required, aggregate transmission bandwidth is about to exceed the limited bandwidth of network 3. Since each low-demand process requires a specific amount of transmission bandwidth, the cumulative bandwidth required by the processes can exceed that of the network, resulting in denials of new requests. However, since each data stream provided in a high-demand process may be shared by many subscribers, and each low-demand process provides only one data stream which is dedicated to a subscriber, the total bandwidth required by a high-demand process is thus always less than that required by many low-demand processes serving the same number of subscribers. In accordance with another aspect of the invention, server 11 is designed to switch a multiplicity of low-demand processes serving a particular event into the corresponding high-demand process whenever the network bandwidth is about to be exceeded. All in all, the purpose of the switching-on-the-fly operation is to ensure efficient utilization of limited resources such as the network bandwidth, the retrieving capacity of the storage device, etc. The switching-on-the-fly operation is further described hereinbelow.

The various processes residing in memory 16 will now be described. Administrative process 5 is designed for coordinating all operations of system 10 in accordance with the invention. It serves as a point of entry for terminals 4 to communicate with server 11, and handles all requests, acknowledgements, and responses. It also allocates double buffers in RAM 17 for each low-demand process.

Figure 5:
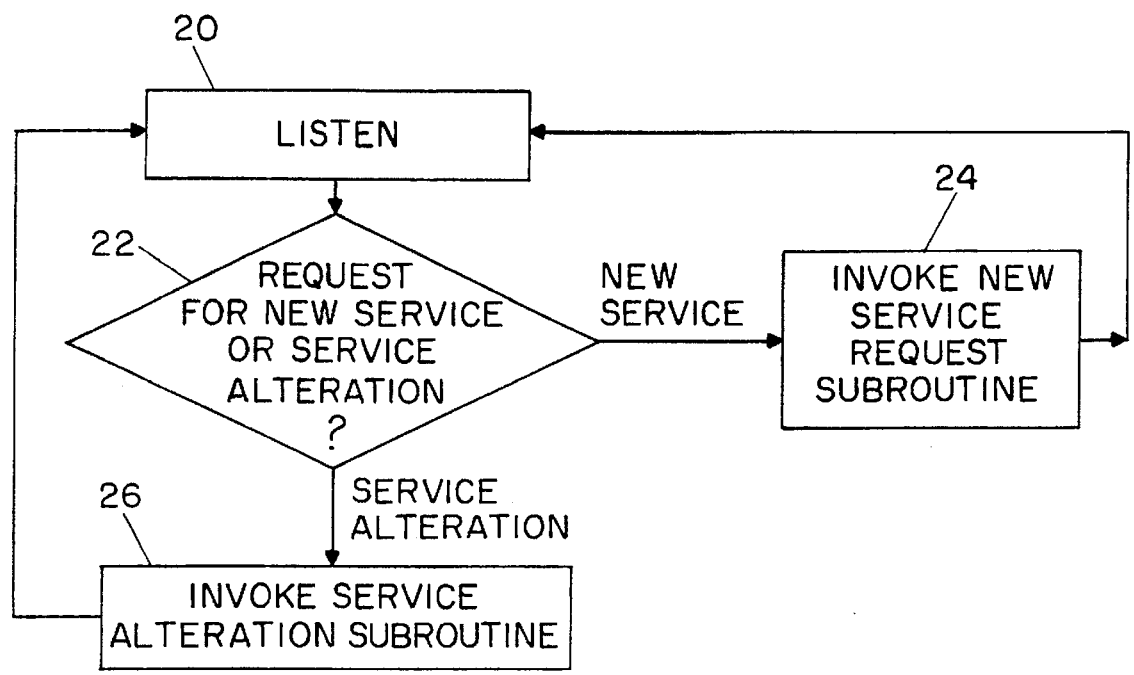
FIG. 5 is a flow chart depicting a subprocess for handling requests from terminals in the system of FIG. 1.

FIG. 5 is a flow chart depicting a subprocess within administrative process 5 for handling service requests from terminals 4. Instructed by such a subprocess, multiprocessor 12 enters a listen mode where the multiprocessor awaits terminals 4 to issue service requests through network 3, as indicated at step 20. Upon receipt of a request, multiprocessor 12 determines at step 22 whether the request is for a new service, or an alteration of a current service which may be fast-forwarding, rewinding, pausing or restarting. If the request is for a new service, i.e., initiating a movie event, the subprocess in question proceeds to step 24 where a new service request subroutine is invoked. Otherwise if the request is to alter a current service, process 5 proceeds to step 26 to invoke a service alteration subroutine.

Figure 6:
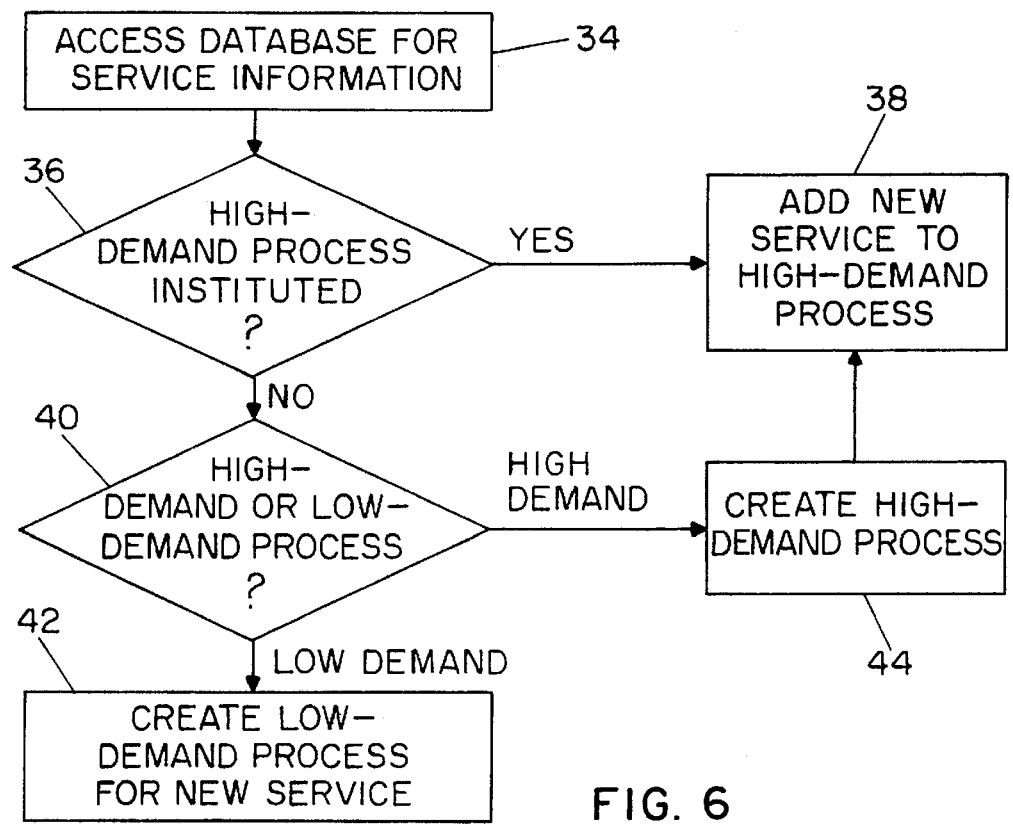
FIG. 6 is a flow chart depicting a subprocess for handling requests for new services from terminals in the system of FIG. 1.

FIG. 6 is a flow chart depicting the new service request subroutine. Instructed by this subroutine, multiprocessor 12 accesses database 9 for necessary event data such as the file location of the requested movie, as indicated at step 34. Multiprocessor 12 at step 36 determines whether a high-demand process has already been instituted for that particular event. If such a high-demand process exists, the terminal requesting the new service is simply added to the high-demand process, as indicated at step 38. Otherwise, multiprocessor 12 at step 40 determines whether the event should be handled using a low-demand process or a high-demand process. If the event is determined to be served by a low-demand process, the multiprocessor 12 creates such a process, as indicated at step 42. Otherwise if a high-demand process is warranted, multiprocessor 12 at step 44 performs the aforementioned switching-on-the-fly operation to create such a process, and proceeds to step 38 previously described.

Figure 7:
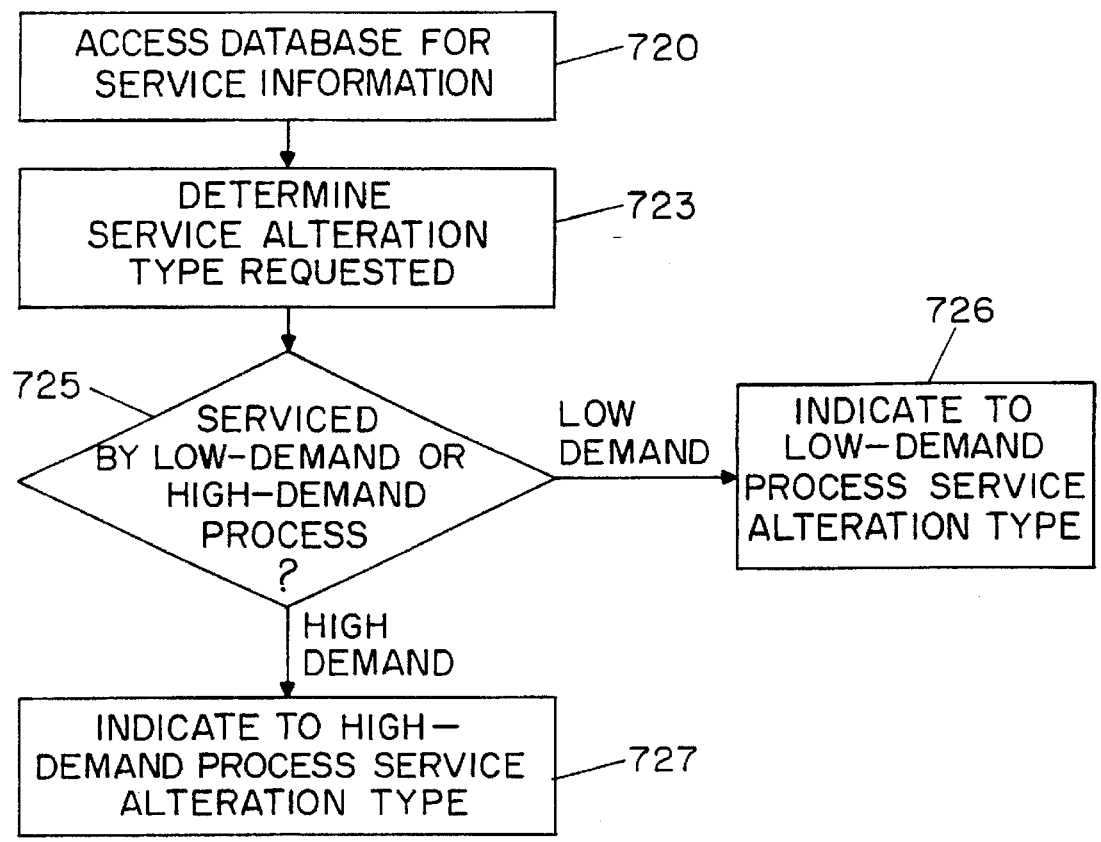
FIG. 7 is a flow chart depicting a subprocess for handling requests for service alterations from terminals in the system of FIG. 1.

FIG. 7 is a flow chart depicting the aforementioned service alteration subroutine. Instructed by this subroutine, multiprocessor 12 queries at step 720 database 9 for information regarding the requesting terminal, including the service features provided to that terminal. The subroutine thence proceeds to step 723 where the multiprocessor determines the type of the service alteration requested. Requests for different service alterations are communicated from terminals 4 to server 11 using appropriately formatted signals pursuant to the ATM scheme. After determining the alteration type, multiprocessor 12 further determines at step 725 whether the event is being served by a low-demand process or a high-demand process. If the event is being served by a low-demand process, multiprocessor 12 indicates to the low-demand process to perform the requested alteration, as indicated at step 726. Otherwise, the multiprocessor at step 727 effects the requested service alteration in the high-demand process.

Administrative process 5 also comprises subprocesses for allocating buffers in RAM 17 for each low-demand process, and for initiating the switch-on-the-fly operation under predetermined conditions.

Figure 8:
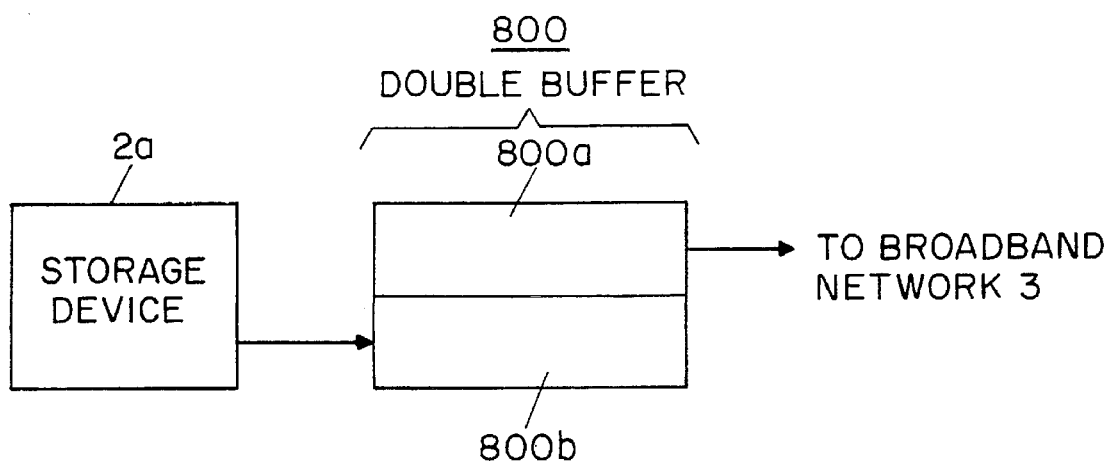
FIG. 8 illustrates data retrieval and transmission in a low-demand process implementing a double-buffering technique in accordance with the invention.

Referring to FIG. 8, once the decision is made in the new service request subroutine that a movie event is to be served via a low-demand process, double buffer 800 is allocated in RAM 17. Double buffer 800 consists of buffer 800a and buffer 800b, each illustratively having a capacity of 500 Kbytes. This technique of double-buffering enables one buffer (say buffer 800a) to transmit data onto network 3 while the other buffer (say buffer 800b) is being filled with multimedia data from an appropriate storage device, say device 2a in this instance. The roles of the two buffers alternate to ensure a continuous flow of data to network 3.

Figure 9A:
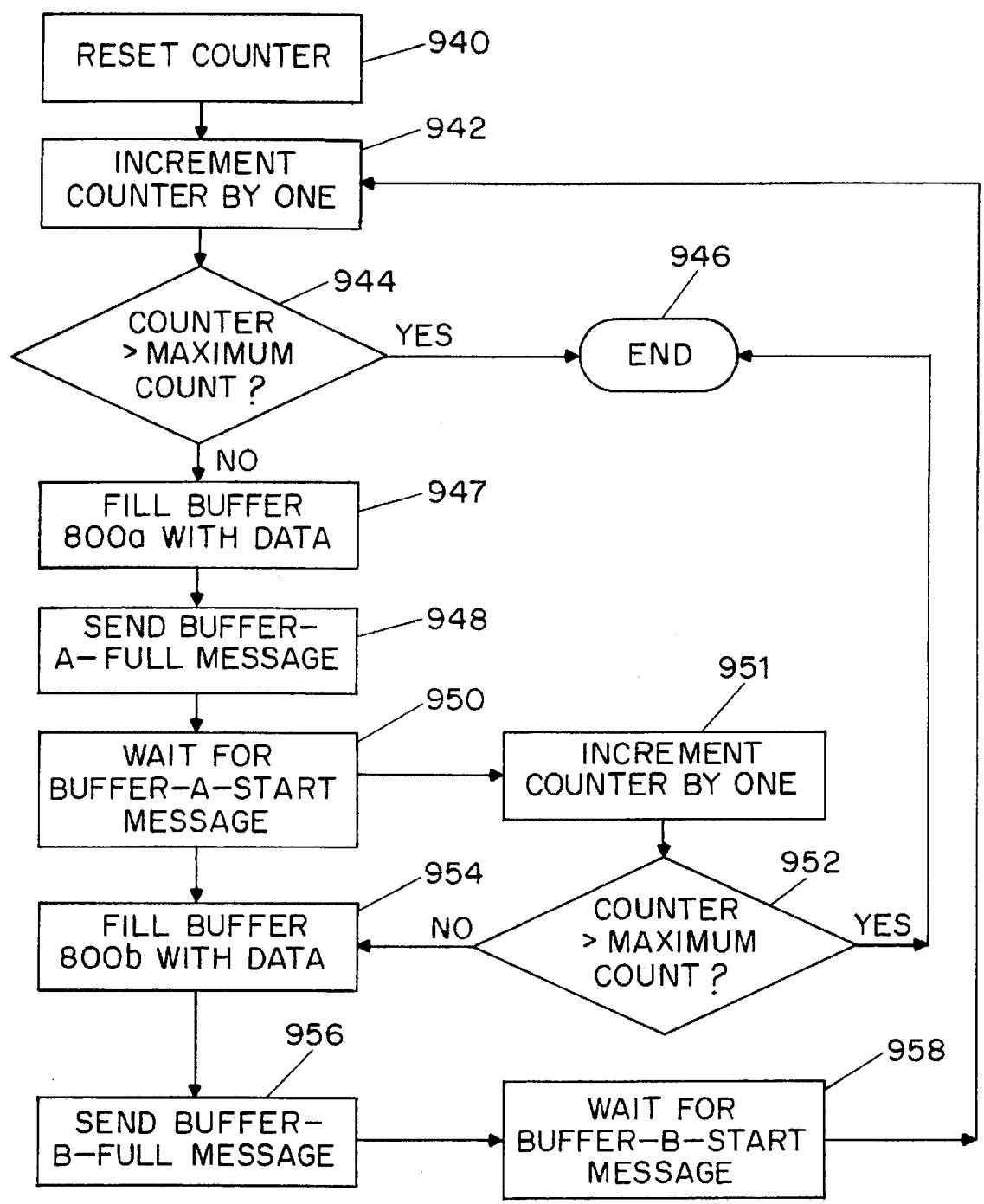
FIG. 9A is a flow chart depicting a process for writing multimedia data to a double buffer in accordance with the double-buffering technique.

The double-buffering technique calls for two subprocesses within a low-demand process, namely, a read subprocess and a write subprocess, to simultaneously read from and write to double buffer 800. FIG. 9A is a flow chart depicting the write subprocess for writing multimedia data from storage device 2a to buffer 800. The write subprocess requires an internal counter to index the event as it is being served so as to keep track of the progress of the event, entertain any service alteration request, and facilitate a switch into a high-demand process in a switch-on-the-fly operation. For each low-demand event, the counter value is ensured not to exceed a maximum count which corresponds to the end of the event. This maximum count is equal to the quotient of the amount of the movie content divided by the size of a buffer, which is 500 Kbytes in this instance. Thus, for example, if the movie content comprises $10^3$ Mbytes, the maximum count is $10^3$ Mbytes/500 Kbytes=2,000.

Instructed by the write subprocess, multiprocessor 12 resets the internal counter to zero, as indicated at step 940. The counter is then increased by one at step 942. The counter value is checked at step 944 whether it is greater than the maximum count. If it is greater than the maximum count, the write subprocess proceeds to an end, as indicated at step 946. Otherwise, it proceeds to step 947 where multiprocessor 12 causes buffer 800a to be filled with multimedia data from device 2a. The data filled is the $c^{th}$ 500 Kbytes of the movie, where c is the current count of the counter. Multiprocessor 12 at step 948 passes a buffer-A-full message to the read subprocess, indicating that data is available for transmission from buffer 800a. Multiprocessor 12 then waits at step 950 for an acknowledgment from the read subprocess.

Figure 9B:
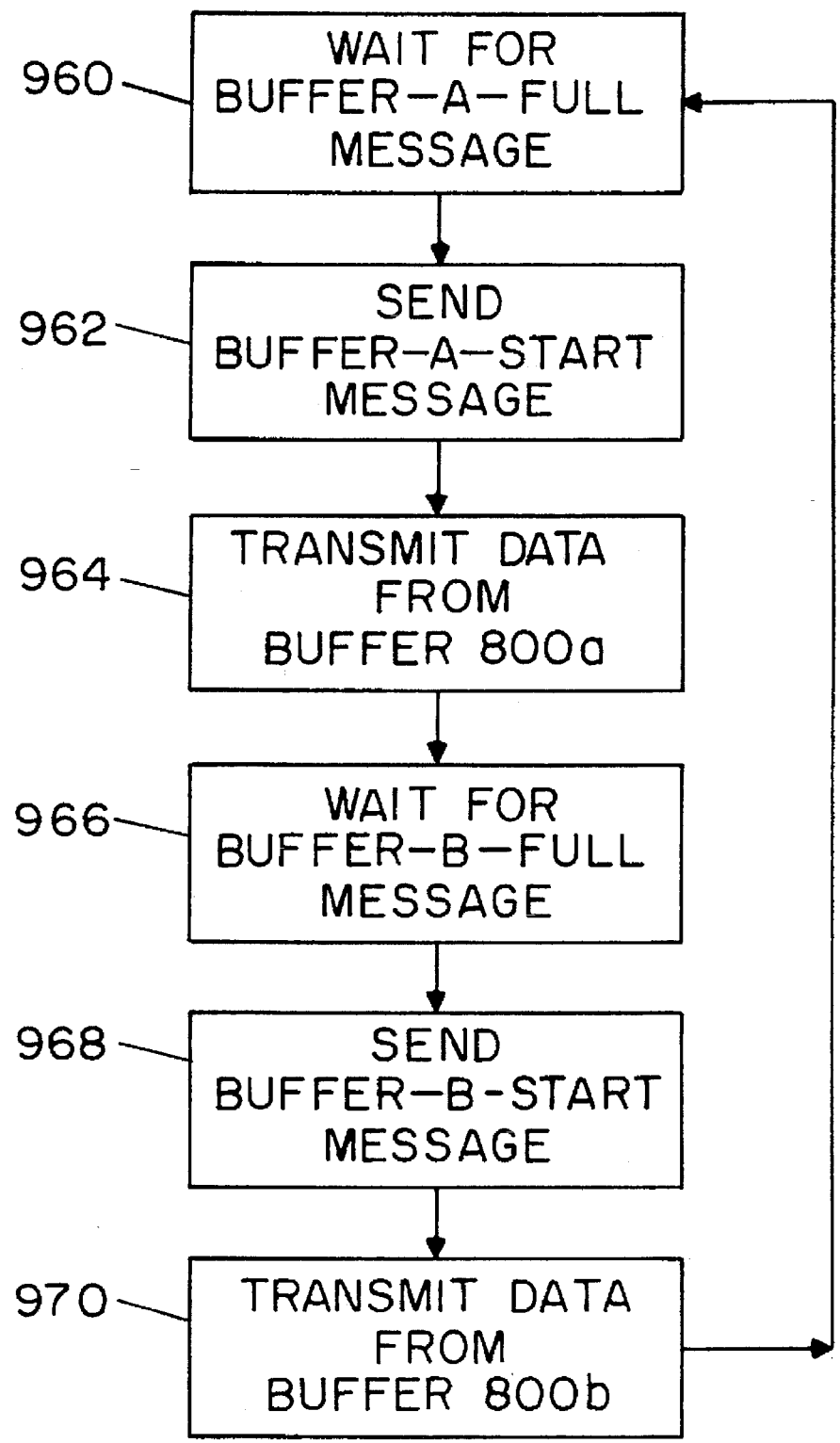
FIG. 9B is a flow chart depicting a process for reading multimedia data from a double buffer in accordance with the double-buffering technique.

The buffer-A-full message triggers the read subprocess in FIG. 9B as it is anticipating such a message at step 960. This read subprocess is for reading data from double buffer 800 and passing it onto network 3. Instructed by the read subprocess, multiprocessor 12 at step 962 passes back a buffer-A-start message as an acknowledgment to the write subprocess. Multiprocessor 12 thence proceeds to step 964 where it causes the data from buffer 800a to be transmitted to network 3. Upon depletion of buffer 800a, the read subprocess halts at step 966, waiting for a buffer-B-full message from the write subprocess.

Upon receiving the buffer-A-start message, the write subprocess restarts as it is anticipating such an acknowledgment at step 950 previously described. Multiprocessor 12 at step 951 increases the counter by one. The counter is then checked at step 952 whether the counter value is greater than the maximum count. If it is greater than the maximum count, the write subprocess again proceeds to an end at step 946. Otherwise, it proceeds to step 954 where multiprocessor 12 causes buffer 800b to be filled with multimedia data from storage device 2a. At step 956, a buffer-B-full message is passed to the read subprocess, indicating that data in buffer 800b is available for transmission. The write subprocess then halts at step 958, waiting for an acknowledgment from the read subprocess.

Upon receiving the buffer-B-full message, the read subprocess restarts as it is anticipating such a message at step 966 previously described. Multiprocessor 12 at step 968 passes a buffer-B-start message back to the write subprocess as an acknowledgment. At step 970, multiprocessor 12 causes the data in buffer 800b to be transmitted to network 3. Upon depletion of buffer 800b, the read subprocess returns to step 960 to start a new cycle. Upon receiving the buffer-B-start message, the write subprocess similarly returns to step 942 to start a new cycle.

Service alterations requested by a subscriber during a low-demand process are easily accomplished as the data stream generated by the above double-buffering technique is dedicated to the subscriber alone. Fast-forwarding of the event is achieved by increasing the above counter by two or more, instead of one, at a time; rewinding of the event is achieved by decreasing the counter one or more at a time, rather than increasing it one at a time.

Pausing is achieved by suspending the above reading subprocess and hence transmission of data from double buffer 800 to the subscriber's terminal. In this particular embodiment, each of terminals 4 is programmed to read from its display buffer containing the last received data from network 3. As the data transmission is suspended in response to a pause request, the content of the display buffer of the terminal is not overwritten and remains the same. As a result, the subscriber would view a still-frame on the terminal display. A restart after pausing is achieved by resuming the above read and write subprocesses with the counter restarting with the last value.

Figure 10:
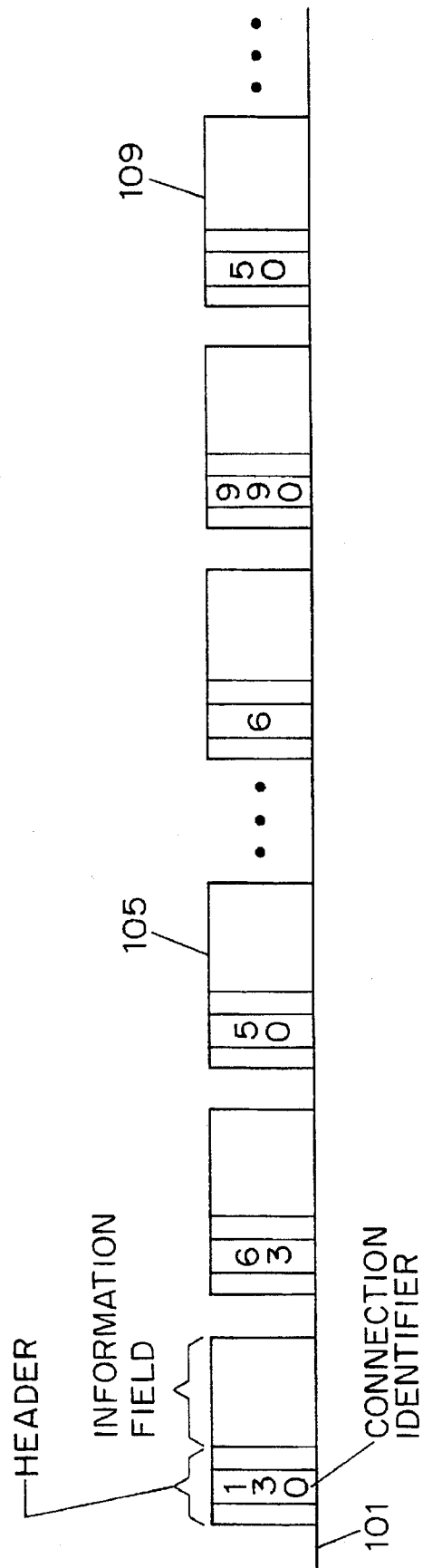
FIG. 10 illustrates a sequence of data cells containing multimedia data on a communication link in the system of FIG. 1.

As mentioned before, network 3 supports an ATM communication scheme. The architecture of one such ATM network is described in: J. Boudec, "Asynchronous Transfer Mode: a tutorial," *Computer Networks and ISDN Systems*, vol. 24, no. 4, May 1992. As is well-known in the art, the ATM scheme allows an easy multiplexing of different virtual connections over a communication link. FIG. 10 illustrates a sequence of ATM cells on communication link 101 in network 3 which are communicated from server 11 to terminals 4 in a statistically multiplexed manner. Each ATM cell contains multimedia data in its information field, and is identified by a connection identifier in its header which is illustratively shown as 130, 63, 50, 6, 990 . . . The aggregate of ATM cells having a particular connection identifier constitute a data stream comprising the information content of a movie. Whenever a new service is established, server 11 first communicates to the terminal requesting the new service a connection identifier identifying the data stream from which the requested movie should be derived. Thus, for example, ATM cells 105 and 109 both having an identifier of 50 contain different parts of the same movie corresponding to the identifier 50.

For a low-demand process, each data stream is dedicated to a particular subscriber. A popular multimedia event served by many low-demand processes may exert excessive burden upon the limited resources of system 10. As mentioned before, in an effort to alleviate such a burden, the low-demand processes involving the same multimedia event may be converted to a high-demand process. To this end, administrative process 5 is also designed to guard against any such overburden and triggers the conversion as the limit of the resources has been reached.

Figure 11A:
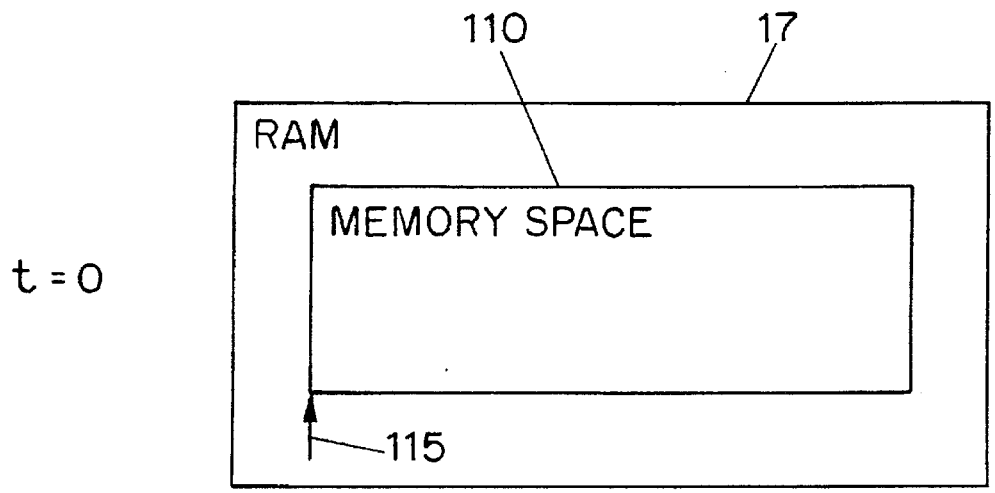
FIGS. 11A, 11B, 11C and 11D illustrate the positions of high-demand pointers with respect to a memory space at different times in the system of FIG. 1.

In a high-demand process, the content of an entire movie is loaded into RAM 17 as discussed before. FIG. 11A illustrates RAM 17 wherein memory space 110 buffers the information content of a high-demand movie, which is two hours or 7,200 sec. long in this instance. In accordance with the invention, in a high-demand process pointers are periodically launched at the start of memory space 110. These pointers hereinafter are referred to as "high-demand pointers." By way of example, in this embodiment a high-demand pointer is launched every 30 seconds.

As shown in FIG. 11A, at the inception of the high-demand process, t=0, high-demand pointer 115 is launched. Conceptually, pointer 115 is pointing at the start of memory space 110 corresponding to the beginning of the movie, and as time progresses it continuously move towards the end of the memory space corresponding to the end of the movie. In reality, pointer 115 indicates the current location of memory space 110 from which server 11 reads the buffered data. The data, thus read, is transmitted over network 3 to subscribers in an ATM format. This being so, a data stream is formed on network 3 as server 11 continuously reads from memory space 110 or, in a different perspective, as pointer 115 sweeps across the memory space. This data stream is associated with pointer 115 with the movie start time t=0.

Figure 11B:
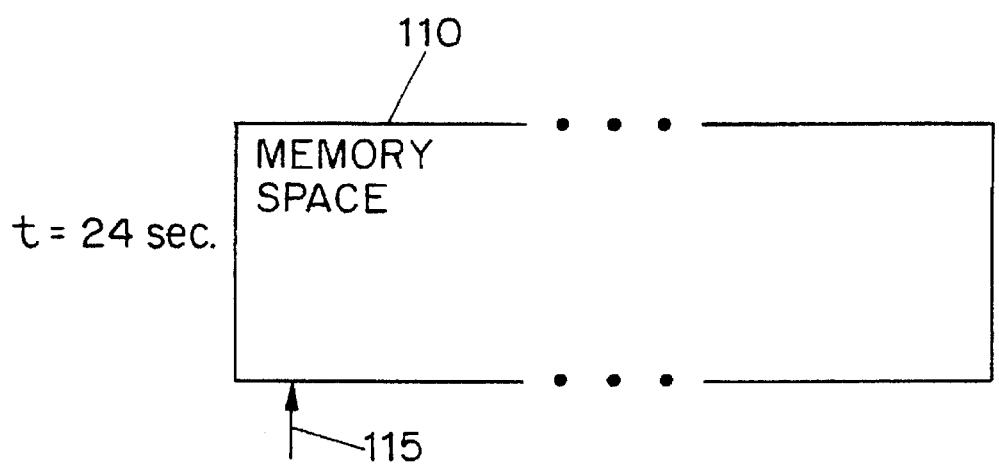

FIG. 11B shows the location of pointer 115 with respect to memory space 110 at t=24 sec. At this point, pointer 115 should have swept across the first 24 sec./7,200 sec.=0.33% of the memory space. Alternately stated, server 11 should have read the multimedia data buffered in the first 0.33% of the memory space. Thus, the data stream associated with pointer 115 so far contains the first 24 seconds' worth of the movie content. In other words, the subscribers receiving such a data stream are now 24 seconds into the movie.

Figure 11C:
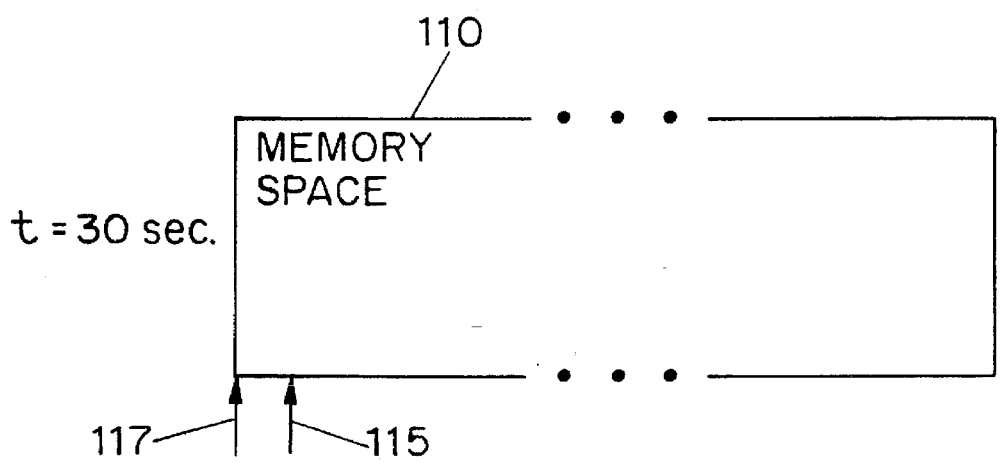

FIG. 11C shows pointer 115 with respect to memory space 110 at t=30 sec. In addition, high-demand pointer 117 is launched at the start of the memory space at this moment. Similarly, pointer 117 is associated with another data stream with a movie start time t=30 sec.

Figure 11D:
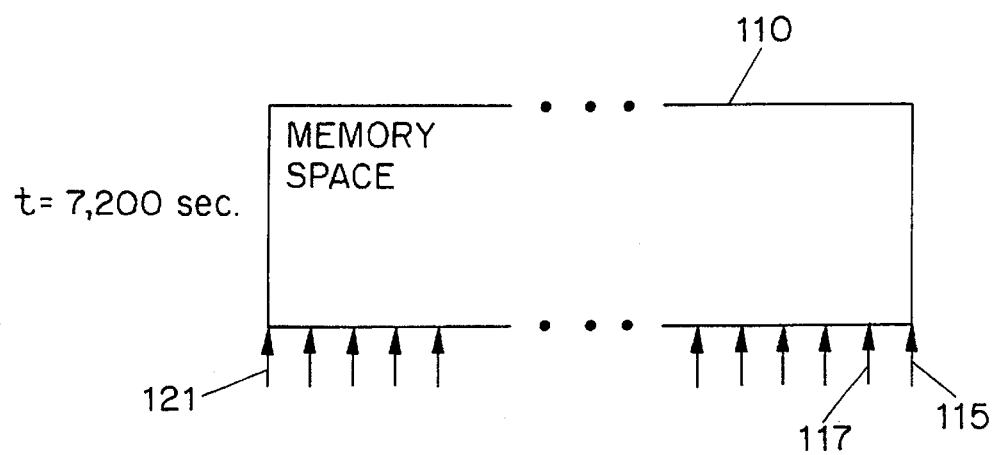

FIG. 11D shows locations of a multiplicity of evenly-spaced high-demand pointers at memory space 110 at t=7,200 sec. At this point, 7,200/30=240 pointers have been launched. As shown in FIG. 11D, pointer 117 is now located at the end of memory space 110 and is being eliminated. At the same time, high-demand pointer 121 is being launched at the start of the memory space. Again, pointer 121 is associated with yet another data stream with a start time of t=7,200 sec. Thus, in general, after t=7,200 sec. there are a maximum of 240 pointers or data streams for subscribers with movie start times 30 seconds apart.

In this illustrative embodiment, when a subscriber requests a movie event which is being served by a high-demand process, this subscriber, along with other subscribers requesting the same movie event, is assigned to a high-demand pointer to be launched. Since a high-demand pointer is launched every 30 seconds, the wait time for these subscribers would be at most 30 seconds. Before the pointer is launched, the subscribers' terminals are individually informed, through appropriate ATM signaling, of the connection identifier identifying the upcoming data stream from which the movie event is derived. This data stream is then multicast through network 3 and are shared by the subscribers.

Figure 12:
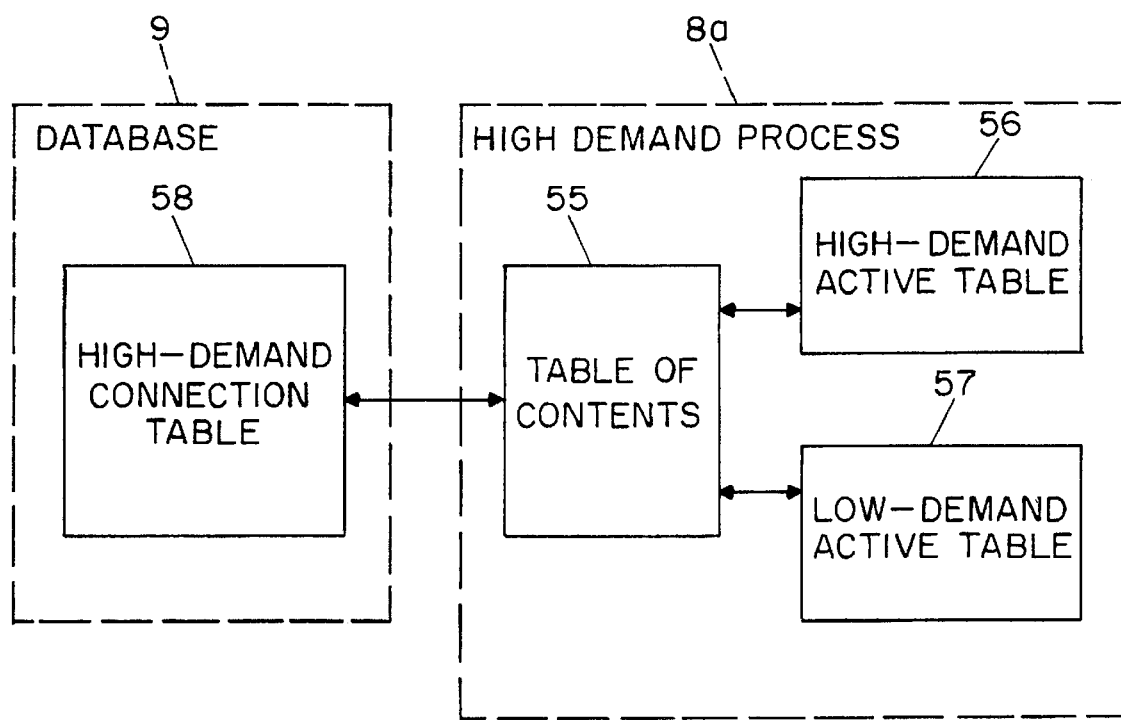
FIG. 12 illustrates the locations of four tables necessary for carrying out a high-demand process in accordance with the invention.

In order to more fully appreciate the operations of a high-demand process, in particular, the realization of service alterations during the process, one needs to understand the arrangements of four different tables, namely, high-demand connection table 58, table of contents 55, high-demand active table 56 and low-demand active table 57. FIG. 12 illustrates the locations of the tables. Specifically, table 58 is within database 9; tables 55, 56 and 57 are within a high-demand process, say 8a, in memory 16.

Figure 13:
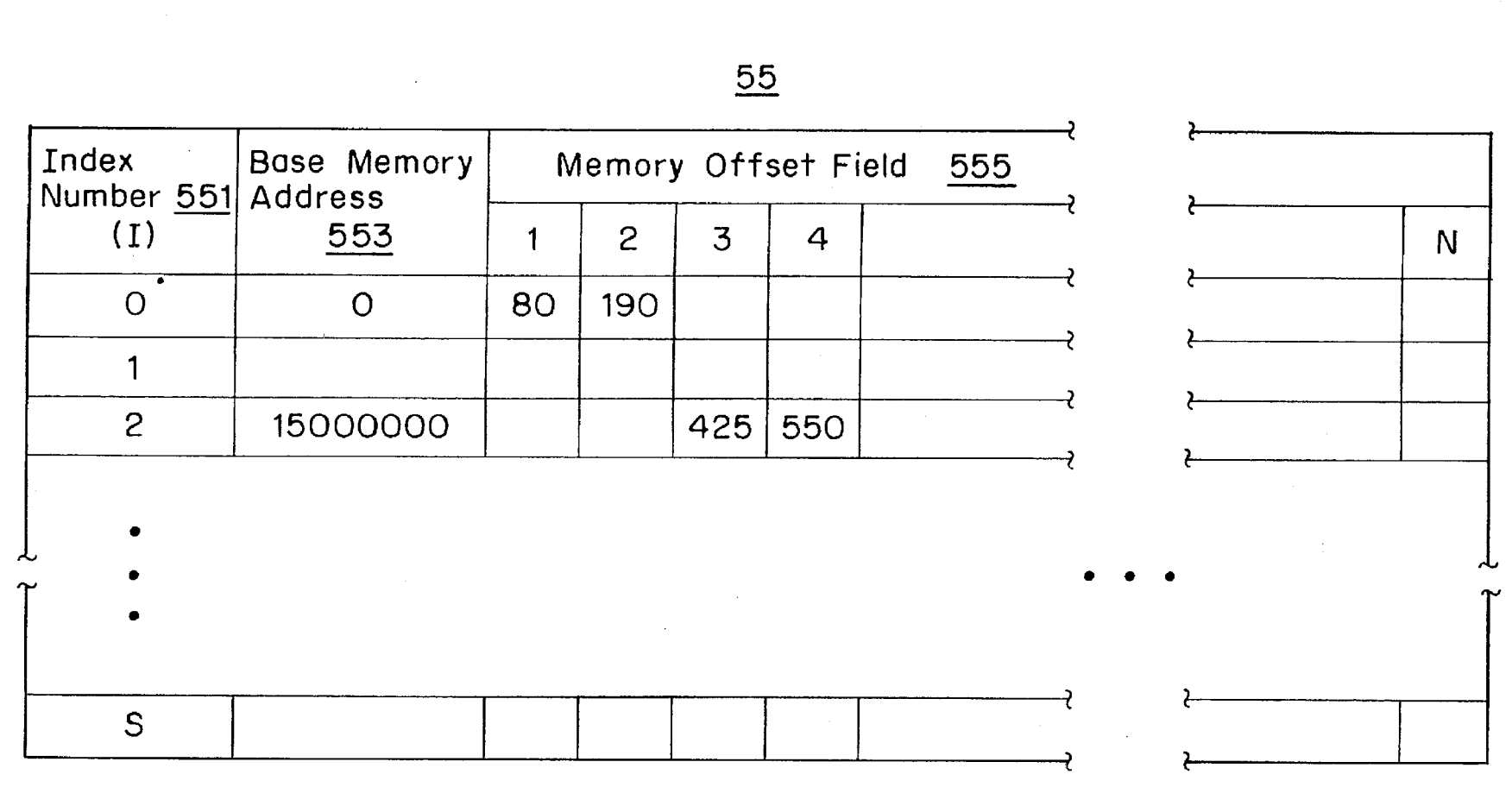

FIG. 13 illustrates table of contents 55 in accordance with the invention. Table 55 serves as a directory of a multimedia event for fast referencing the memory location of a given pointer. Index column 551 contains index numbers (I) which range from 0 to a maximum integer S. Each base memory address entry in column 553 is associated with a different index number I in the same row, and specifies the location of the movie content in memory space 110 after I pointer periods of the event have elapsed. The integer S is defined as follows:

$$S = INT(T_{total}/T_{diff}) - 1; \quad (a)$$

where INT (*) is a mathematical operator whereby only the integer part of the argument * is taken, e.g., INT (3.7)=3; $T_{total}$ is the total time of the movie event; and $T_{diff}$ is the difference between the launch times of two neighboring high-demand pointers (or in other words the period of the high-demand pointers).

Continuing the above example where $T_{total}$=7,200 sec. and $T_{diff}$=30 sec., thus S=239. In addition, the third entry of column 553 is associated with index number 2, and thus specifies the memory address of the movie content after two pointer periods, i.e., 30×2=60 sec., of the movie have elapsed. This memory address is illustratively 15000000 (decimal). Since a high-demand pointer is launched at the beginning of each pointer period and thence sweeps across memory space 110 as time progresses, each pointer, thus launched, must necessarily stand at a different one of the base memory addresses of column 553 at the beginning of each pointer period.

The first entry 0 (decimal) in column 553 of FIG. 13 is the memory address of the beginning of the movie content in memory space 110. In this instance each addressable register in RAM 17 has a capacity of one byte. Since the memory address starts at 0 (decimal), the above base memory address 15000000 (decimal) conveniently indicates where the 15,000,001$^{st}$ byte of the movie is. This being so, in this particular embodiment the first 60 seconds of the movie must comprise 15 Mbytes of multimedia data.

A typical unit of the movie content is a frame. For example, terminals 4 need to display 30 frames/sec. in order to properly show the movie event in this particular embodiment. However, frames are normally assembled in groups-of-frames (GOF) for video compression purposes. Each GOF consists of a predetermined number of frames which is 12 in this instance. Depending on the redundancy of the frames in individual GOF's, their lengths in bytes differ as each GOF may command a different compression ratio.

Memory Offset field 555 comprises subcolumns 1 through N. In general, an entry in subcolumn u associated with a particular base memory address, indicates a memory offset where the u$^{th}$ GOF from the base address begins and (u-1)$^{th}$ GOF ends. The offset is expressed in number of Kbytes. Take the first row containing the base memory address 0 (decimal) for example. The entry in subcolumn 1 in this row is 80. That is, the 1$^{st}$ GOF after the base address 0 is located 80 Kbytes therefrom. In other words, the 0$^{th}$ GOF which begins at the base address 0 (decimal) is 80 Kbytes long. Similarly, the next entry 190 in subcolumn 2 indicates that the second GOF after the base address 0 is located 190 Kbytes therefrom. In other words, the 1$^{st}$ GOF is (190−80) =110 Kbytes long. In addition, the third and fourth GOF's after the base address 15000000 are respectively 425 Kbytes and 550 Kbytes therefrom.

In accordance with the invention, N is defined as follows: as a high-demand pointer stands at a base memory address at the beginning of a pointer period, N is the number of additional GOF's that the pointer will pass before the end of the pointer period. In other words, within a pointer period a pointer at a base memory address passes N+1 GOF's including the 0$^{th}$ GOF located at the base address. The following is the formula for N:

$$N = \frac{T_{diff} \times R_{frame}}{F_{group}} - 1; \quad (b)$$

where $R_{frame}$ is the frame rate of the movie event; $F_{group}$ is the number of frames in a GOF; and, again, $T_{diff}$ is the difference between the launch times of two neighboring high-demand pointers. Continuing the above example where $T_{diff}$=30 sec., $F_{group}$=12 and $R_{frame}$=30 frames/sec., thus N=74 in this example.

Based on the discussion heretofore, it should be apparent to a person skilled in the art that the memory offset entry ($M_{offset}[k]$) in the k$^{th}$ subcolumn of field 555 associated with a particular base memory address can be determined as follows:

$$M_{offset}[k] = \sum_{j=0}^{k-1} L_j \quad k = 1, 2, \ldots, N; \quad (c)$$

where $L_j$ is the GOF length of the $j_{th}$ GOF away from the particular base memory address, and $L_0$ is the length of the 0$^{th}$ GOF located at the base address. The length of each GOF, $L_j$, is stored in database 9.

Figure 14:
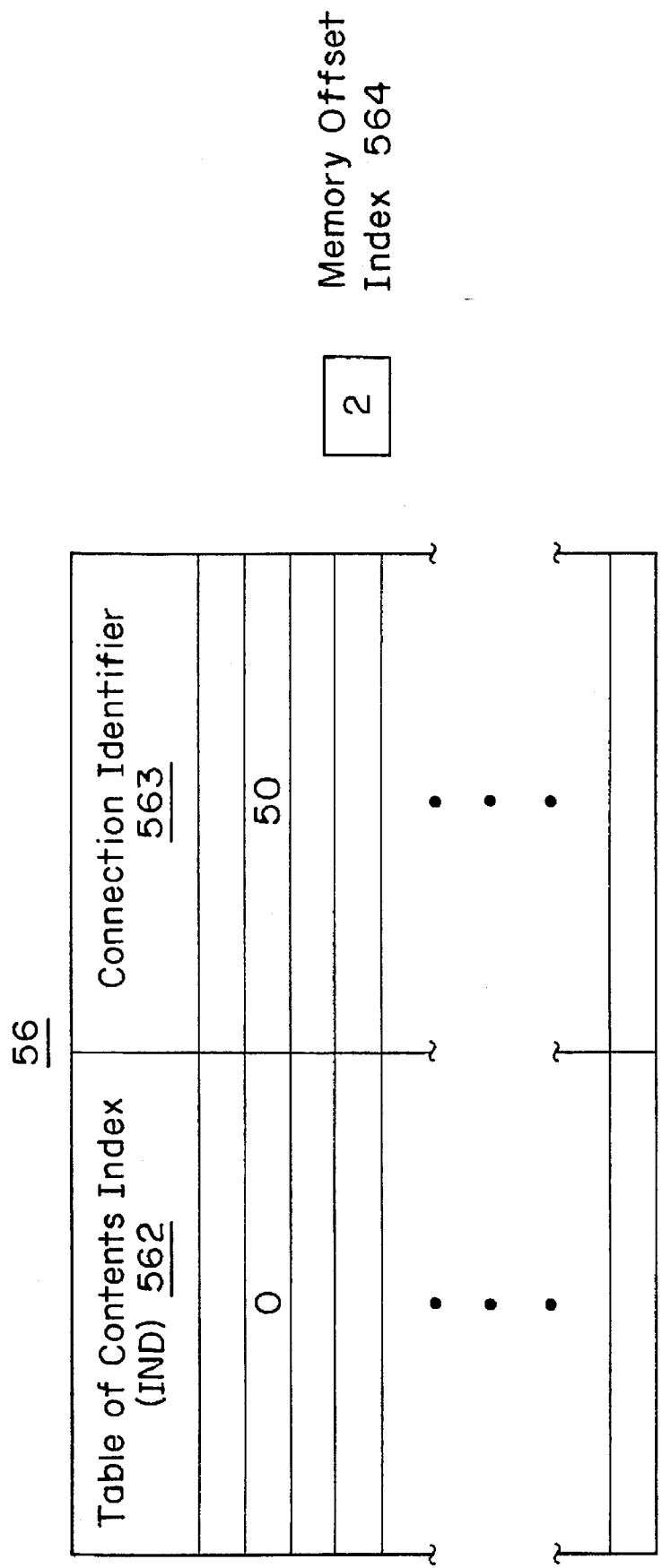
FIG. 14 is a second one of the four tables of FIG. 12.

FIG. 14 illustrates high-demand active table 56 in accordance with the invention. Table 56 includes table of contents index column 562 and connection identifier column 563. Column 563 enumerates all active high-demand pointers represented by the connection identifiers identifying the data streams associated with the pointers. A pointer is considered active when at least one subscriber is viewing its associated data stream. The entries of index column 562 reference those of column 551 of table 55. Therefore, the maximum number of entries in column 551 is S+1 and their values range from 0 to S. These index entries are sorted in an ascending order and each associated with a different high-demand pointer appearing in the same row.

As previously discussed, at the beginning of each pointer period, each high-demand pointer stands at a different base memory address specified in column 553. In accordance with another aspect of the invention, it takes a pointer period for a high-demand pointer to sweep through all the N GOF's after the base address. Since the rate at which each pointer passes the GOF's is constant by virtue of a fixed frame rate, all the high-demand pointers thus would have passed the same number of GOF's from the respective base addresses at any given moment. Memory offset index 564 in table 56 keeps track of this number. Moreover, the latter references the subcolumn number of memory offset field 555 of Table 55.

Thus, for example, a high-demand pointer with a connection identifier 50 is currently standing at the second GOF after the base memory address 0. This being so, the index entry in column 562 associated with the high-demand pointer is 0, referencing the row having I=0 in table 55 as this row contains the memory base address 0. The current value of index 564 must be 2 as the pointer is standing at the second GOF. This index value 2 also applies to all other high-demand pointers listed in table 56. Thus, in general, the index entry in column 562 indicates the base address of the associated pointer, and index 564 indicates which GOF after the base address the pointer is at. Through memory offset field 555, index 564 can be translated to the corresponding memory offset. Such a memory offset, together with the known base address, renders the current memory location of the pointer in question.

FIG. 15 illustrates low-demand active table 57 in accordance with the invention. Table 57 enumerates pointers associated with the data streams which were previously served by the respective low-demand processes now merged into the high-demand process. These pointers are hereinafter referred to as "low-demand pointers." Table 57 comprises table of contents index column 571, memory offset index column 573 and connection identifier column 575. The structure of low-demand active table 57 is similar to that of high-demand active table 56 just described, and the entries of the tables serve similar purposes. However, unlike table 56, table 57 requires a separate memory offset index entry for each low-demand pointer. This stems from the fact that a low-demand process may merge into a high-demand process at any point of the movie event. When the merge occurs, each low-demand process is assigned to a different, newly-generated low-demand pointer. Thus, unlike the high-demand pointers, the low-demand pointers are not launched at a fixed pointer period. As a result, unlike the high-demand pointers, at any given moment the low-demand pointers would not necessarily have passed the same number of GOF's from their respective base addresses. As such, each low-demand pointer needs a separate index in column 573 to keep track of its memory offset.

FIG. 16 illustrates high-demand connection table 58 in accordance with the invention. The main purpose of table 58 is to facilitate service alterations and/or random access of a high-demand movie event. Table 58 comprises connection identifier column 580, number of subscribers column 583, and start time column 585. Column 585 contains all the start times of a high-demand movie event, or in other words launch times of all high-demand pointers, including the upcoming pointer to be launched. These high-demand pointers are identified by the respective connection identifiers of column 580. The start times in column 585 is the true time of the day when each pointer is launched. This column facilitates calculations to determine the current and any desired show times of the movie event. As the launch times of any two neighboring pointers are separate by a pointer period, any two neighboring start times are separate by same.

In this instance, the present time of the day is 20 hours, 0 minutes and 15 seconds (20:00:15). The start time or the launch time of the upcoming pointer is 20:00:30 as shown in the first row of table 58. That is, the upcoming pointer will be launched in 15 seconds. In addition, table 58 contains start times of other 240 pointers which are 30 seconds apart.

Column 583 records the number of subscribers receiving the data stream associated with each high-demand pointer. If the number of subscribers of a particular data stream is zero, the associated pointer is said to be inactive. In order to save network bandwidth, such a data stream is not generated. As such, no connection identifier is assigned to an inactive pointer. For example, row 161 in FIG. 16 corresponds to an inactive pointer.

If a new subscriber attempts to access a data stream to which nobody has subscribed, the associated pointer becomes active. A new connection identifier is then assigned to the activated pointer and is communicated to the new subscriber for identifying the data stream to be received. The corresponding number of subscribers is increased from zero to one. If a new subscriber accesses a data stream to which one or more subscribers have been subscribing, the corresponding number of subscribers is increased by one. Upon receiving a signal from one of terminals 4 indicating a termination of a subscription, server 11 decreases the number of subscribers of the corresponding data stream by one.

Figure 17:
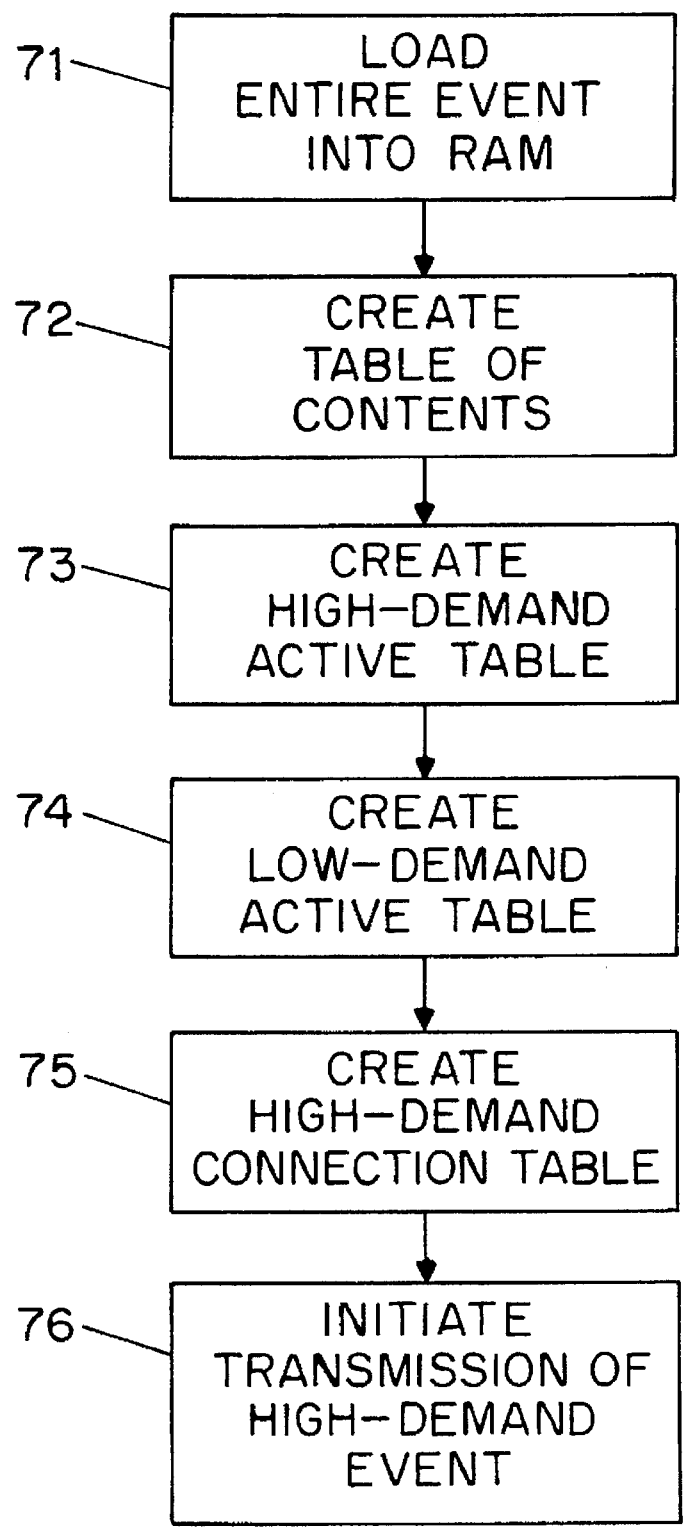
FIG. 17 is a flow chart depicting the steps for establishing the high-demand process.

FIG. 17 is a flow chart depicting a set-up subprocess within a high-demand process. In accordance with such a subprocess, a copy of the entire multimedia event is loaded into memory space 110 of RAM 17, as indicated at step 71. The process proceeds to step 72 where table of contents 55 is created. High-demand active table 56 and low-demand active table 57 are then created at steps 73 and 74, respectively. High-demand connection table 58 is created at step 75 in database 9. The transmission of the high-demand event is initiated at step 76.

Figure 18A:
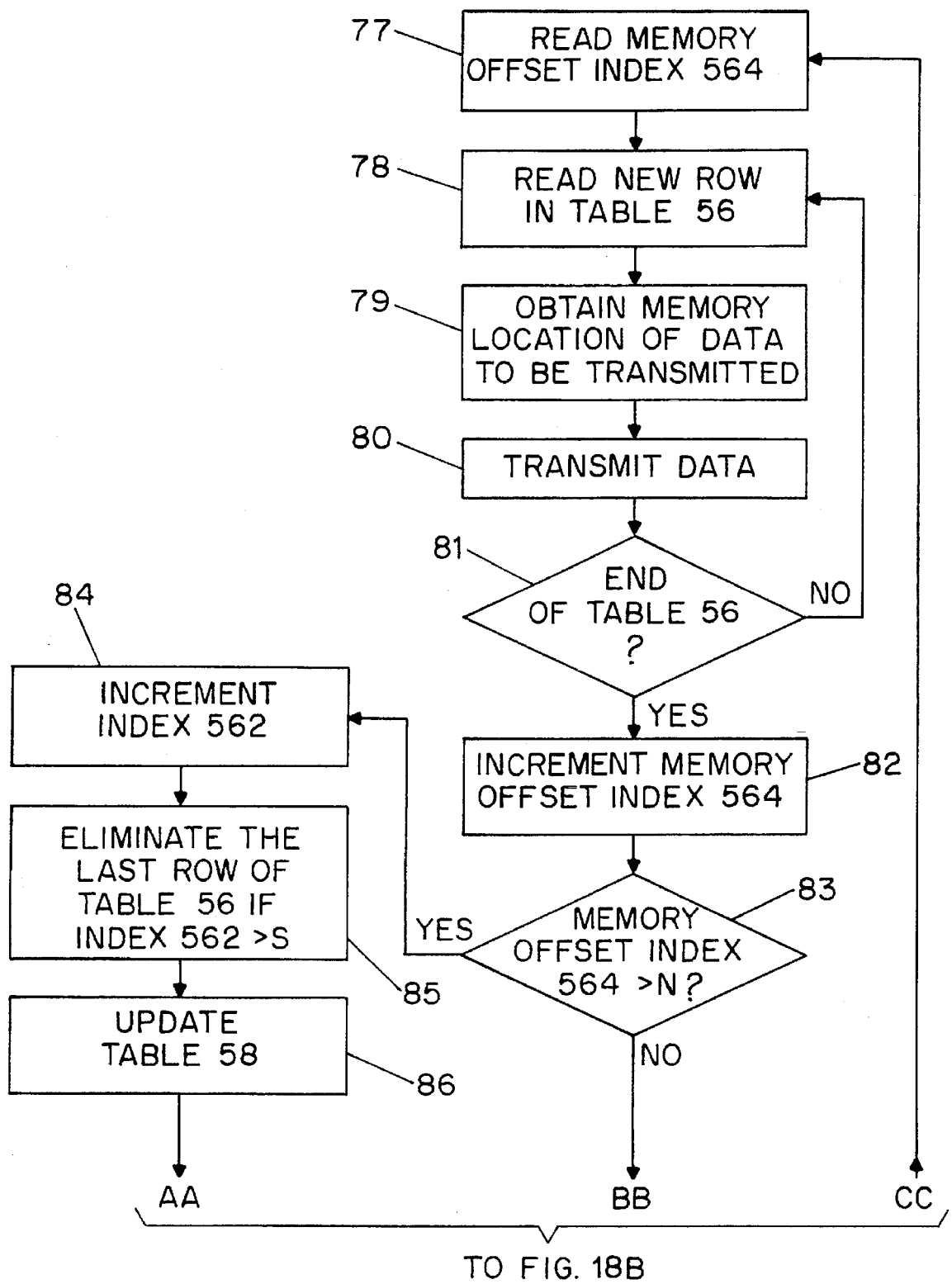
FIGS. 18A and 18B combinedly describe a subprocess for transmitting data in the high-demand process.
Figure 18B:
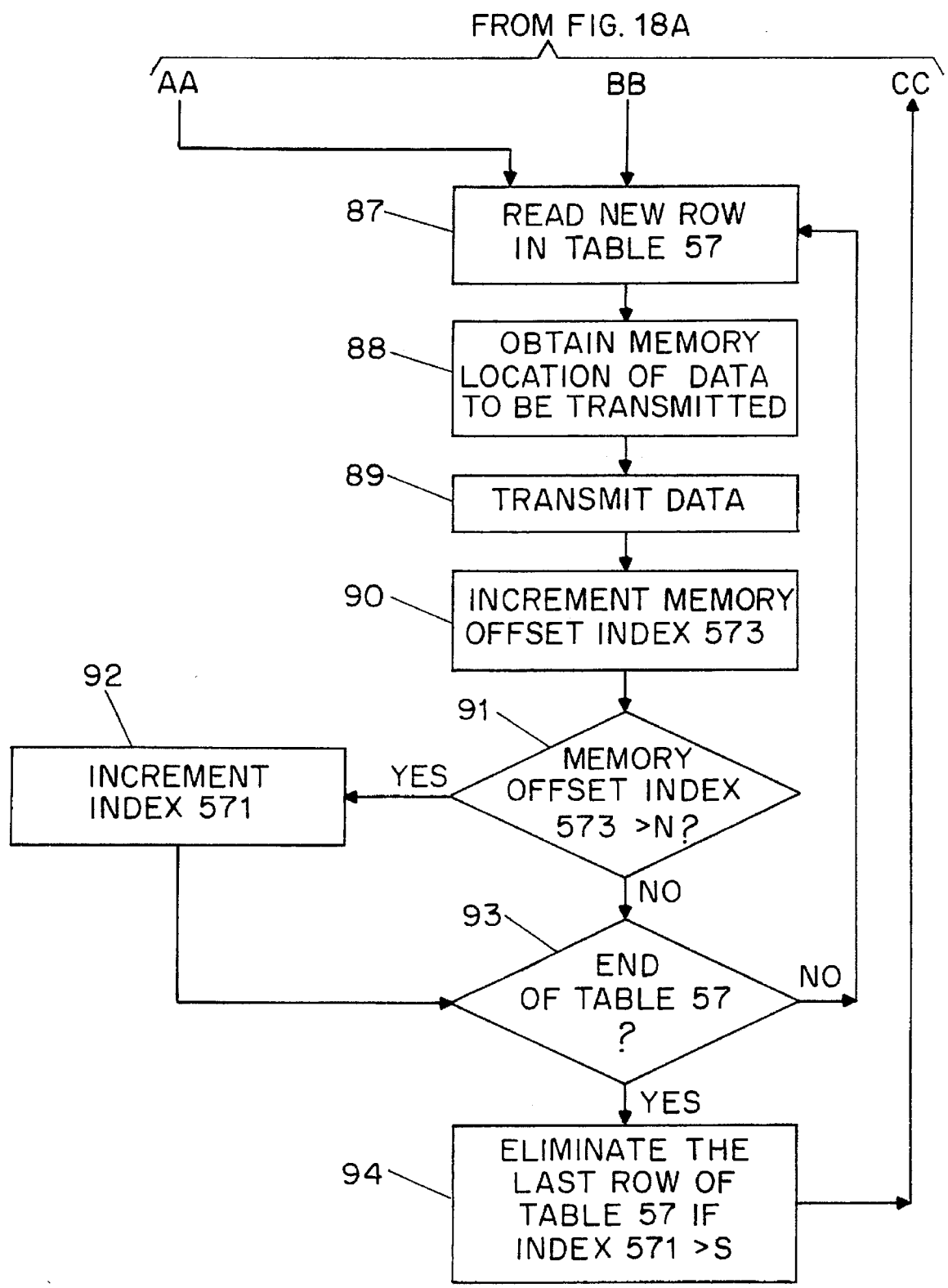

FIGS. 18A and 18B describe a transmission subprocess within the high-demand process. Refer now to FIGS. 13 through 16 in addition to FIGS. 18A and 18B. Instructed by the transmission subprocess, multiprocessor 12 first reads memory offset index 564 from high-demand active table 56, as indicated at step 77. A first row including entries in index column 562 and corresponding connection identifier 563 is read at step 78. The transmission subprocess then proceeds to step 79 where the entry of index column 562, together with the above index 564, is used to reference the table of contents 55 to obtain the memory location for the GOF to be transmitted. At step 80, the GOF is retrieved from the memory location and transmitted over network 3 using the connection identifier just read. Multiprocessor 12 determines at step 81 whether the row being read from table 56 is its last row. If it is not the last row, multiprocessor 12 returns to step 78 previously described to read a second row of table 56. Otherwise if it is the last row, multiprocessor 12 at step 82 causes memory offset index 564 to increase by one. Multiprocessor 12 then determines at step 83 whether the memory offset index is greater than N as defined above. If the index is smaller or equal to N, the transmission process proceeds to step 87 in FIG. 18B to be described. Otherwise, multiprocessor 12 causes each entry in index column 562 to increase by one, as indicated at step 84. Multiprocessor 12 at step 85 eliminates the last row of table 56 if the entry of column 562 in that row exceeds S, the maximum index value defined above. At step 86, multiprocessor 12 updates table 58 to remove the row corresponding to the pointer at the end of the multimedia event, and to insert a new row corresponding to a high-demand pointer which has just been launched. This completes transmission of all GOF's which the active, high-demand pointers indicated or pointed to. The transmission process thence again proceeds to step 87 where the transmission of the GOF's which the low-demand pointers are indicating starts.

At step 87, a first row of low-demand active table 57 including an entry of index 571, and the corresponding memory offset index 573 and connection identifier 575 is read. The entry of index 571 in this row is used to reference table 55 to obtain the memory location for the multimedia data to be transmitted, as indicated at step 88. At step 89, the multimedia data is retrieved from the memory location and transmitted over network 3 using the connection identifier just read. Multiprocessor 12 at step 90 causes memory offset index 573 to increase by one. Multiprocessor 12 then determines at step 91 whether the memory offset index is greater than N defined above. If the index is smaller than or equal to N, the transmission subprocess proceeds to step 93 to be described. Otherwise, multiprocessor 12 causes the entry in index column 571 to increase by one, as indicated at step 92. The transmission process again proceeds to step 93, where multiprocessor 12 determines whether the current row is the last row of table 57. If it is not the last row, the transmission process returns to step 87 where a second row of table 57 is read. Otherwise if it is the last row, the transmission process proceeds to step 94 where multiprocessor 12 eliminates the last row of table 57 if the entry of column 571 in that row now exceeds S defined above. This now completes transmission of all GOF's which the low-demand pointers indicated. The transmission process then returns to step 77 previously described to start transmission of the next set of GOF's which the active, high-demand pointers are indicating.

Figure 19:
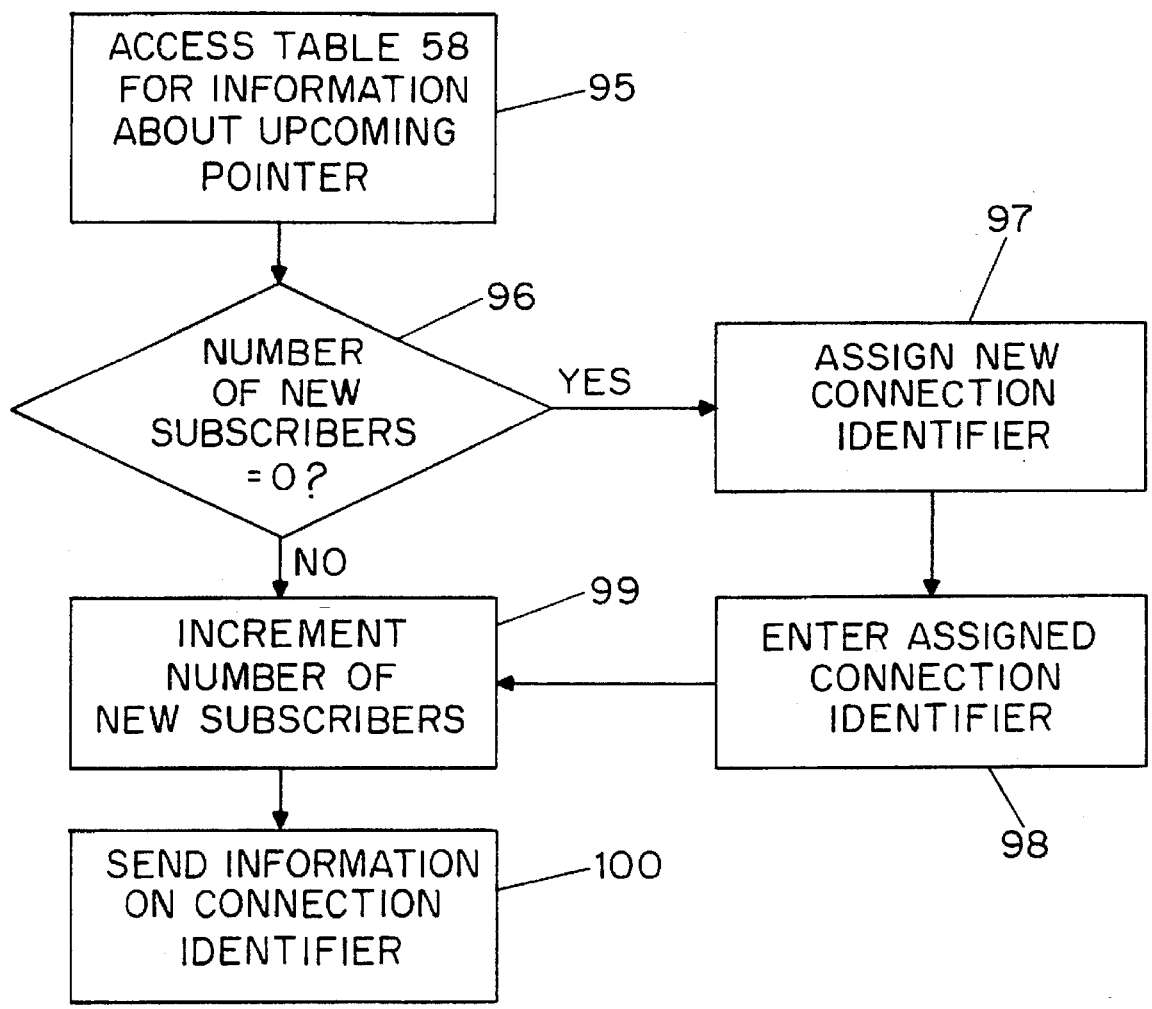
FIG. 19 is a flow chart depicting a subprocess for adding a new subscriber to the high-demand process.

Administrative process 5 is also used to add new subscribers to a high-demand process. FIG. 19 illustrates the flow chart depicting the subprocess within process 5 for adding a new subscriber to an existing high-demand process. Instructed by such a subprocess, multiprocessor 12 accesses high-demand connection table 58 for the connection identifier, if any, associated with the high-demand pointer to be launched, as indicated at step 95. Table 58 contains information as to the number of new subscribers who have queued up for the upcoming pointer. At step 96, multiprocessor 12 determines whether the number of new subscribers recorded in column 583 of table 58 is currently zero. If this number is currently zero (i.e., the new subscriber to be added is the first in the queue and no connection identifier has been assigned therefor), multiprocessor 12 assigned a new connection identifier identifying the multimedia data stream or pointer to be launched, as indicated at step 97. At step 98, multiprocessor 12 then enters in column 580 in the last row of table 58 the connection identifier just assigned. At step 99, multiprocessor 12 increases the associated entry in number of subscribers column 583 by one, reflecting the addition of the new subscriber. Returning briefly to step 96, if multiprocessor 12 determines that the number of subscribers in the queue is currently nonzero, it directly proceeds to step 99 just described. In any event, multiprocessor 12 proceeds from step 99 to step 100 where the terminal of the new subscriber is informed of the connection identifier identifying the multimedia data stream from which the movie event is to be derived.

Figure 20:
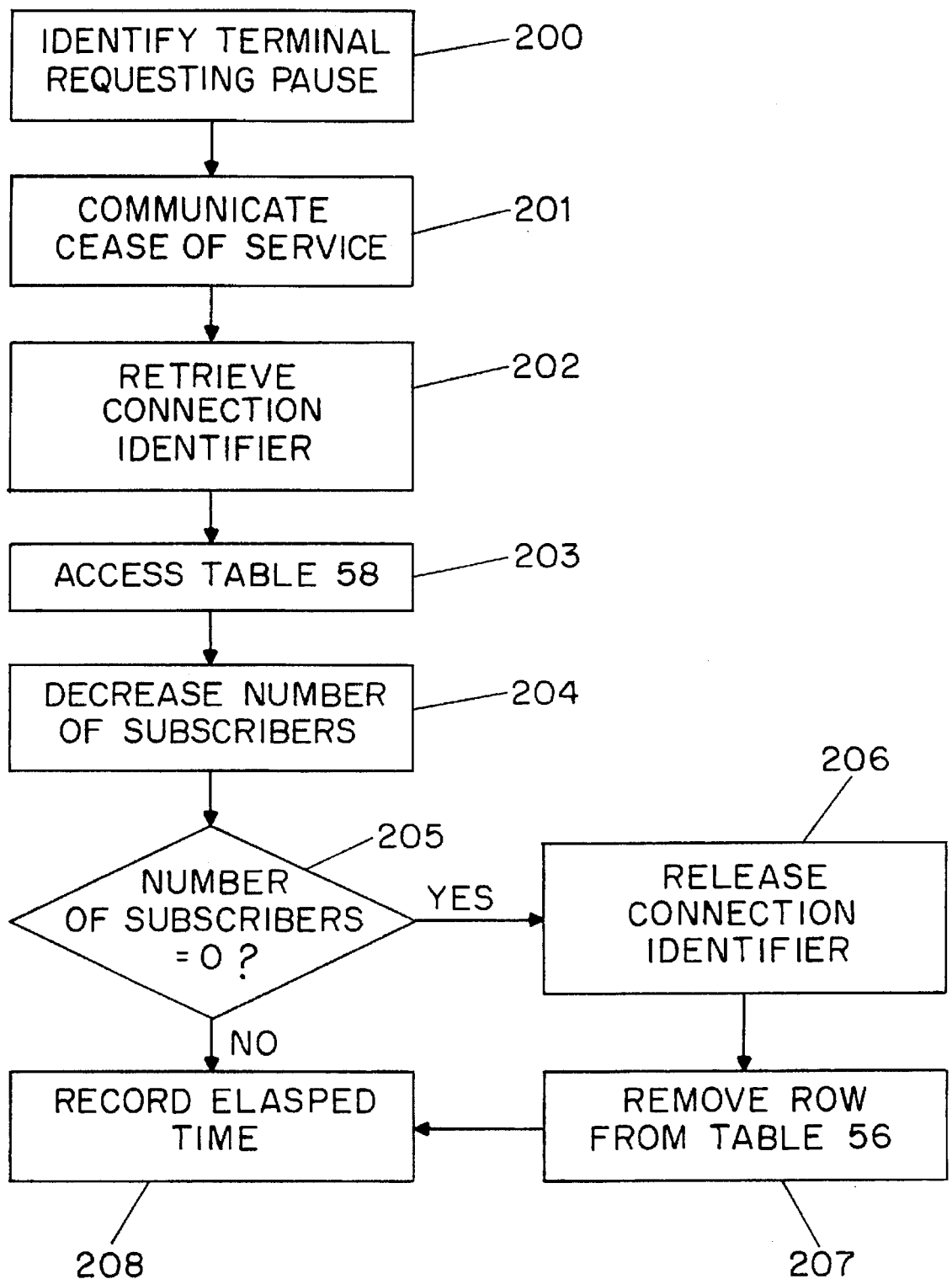
FIG. 20 is a flow chart depicting a subprocess for handling a pause request in the high-demand process.

The pointer hopping technique applied in the high-demand process to manipulate the multimedia event to realize pausing, restarting, fast-forwarding and rewinding in accordance with the invention will now be described. FIG. 20 is a flow chart depicting a subprocess within administrative process 5 for performing the pause operation. Instructed by such a subprocess, multiprocessor 12 identifies the subscriber's terminal requesting a pause based on the subscriber connection information in database 9, as indicated at step 200. At step 201, multiprocessor 12 communicates to the subscriber's terminal that it is no longer served by any data stream. As a result, this terminal stops receiving data from network 3. The display buffer of the subscriber's terminal however contains the last received data and, such data is not overwritten. Consequently, the terminal constantly displays the last received data in the display buffer, thereby achieving the pause operation.

Multiprocessor 12 also retrieves from database 9 the connection identifier identifying the data stream which the subscriber in question is receiving, as indicated at step 202. Multiprocessor 12 then proceeds to step 203 where it accesses high-demand connection table 58 for the row containing the connection identifier just retrieved. At step 204, multiprocessor 12 decreases in column 583 in this row the number of subscribers by one. Multiprocessor 12 then determines at step 205 whether this number of subscribers has been reduced to zero. If such a number is zero, multiprocessor 12 proceeds to step 206 where it releases the above connection identifier for later use. As a result, the data stream identified by the connection identifier is disconnected and removed from network 3 to save the network bandwidth. At step 207, multiprocessor 12 removes the above row from high-demand active table 56. Multiprocessor 12 at step 208 records for the subscriber in database 9 the elapsed movie time just before the pause, i.e., the amount of time into the movie. Returning briefly to step 205, if the number of subscribers is nonzero, multiprocessor 12 directly proceeds to step 208 just described.

Figure 21:
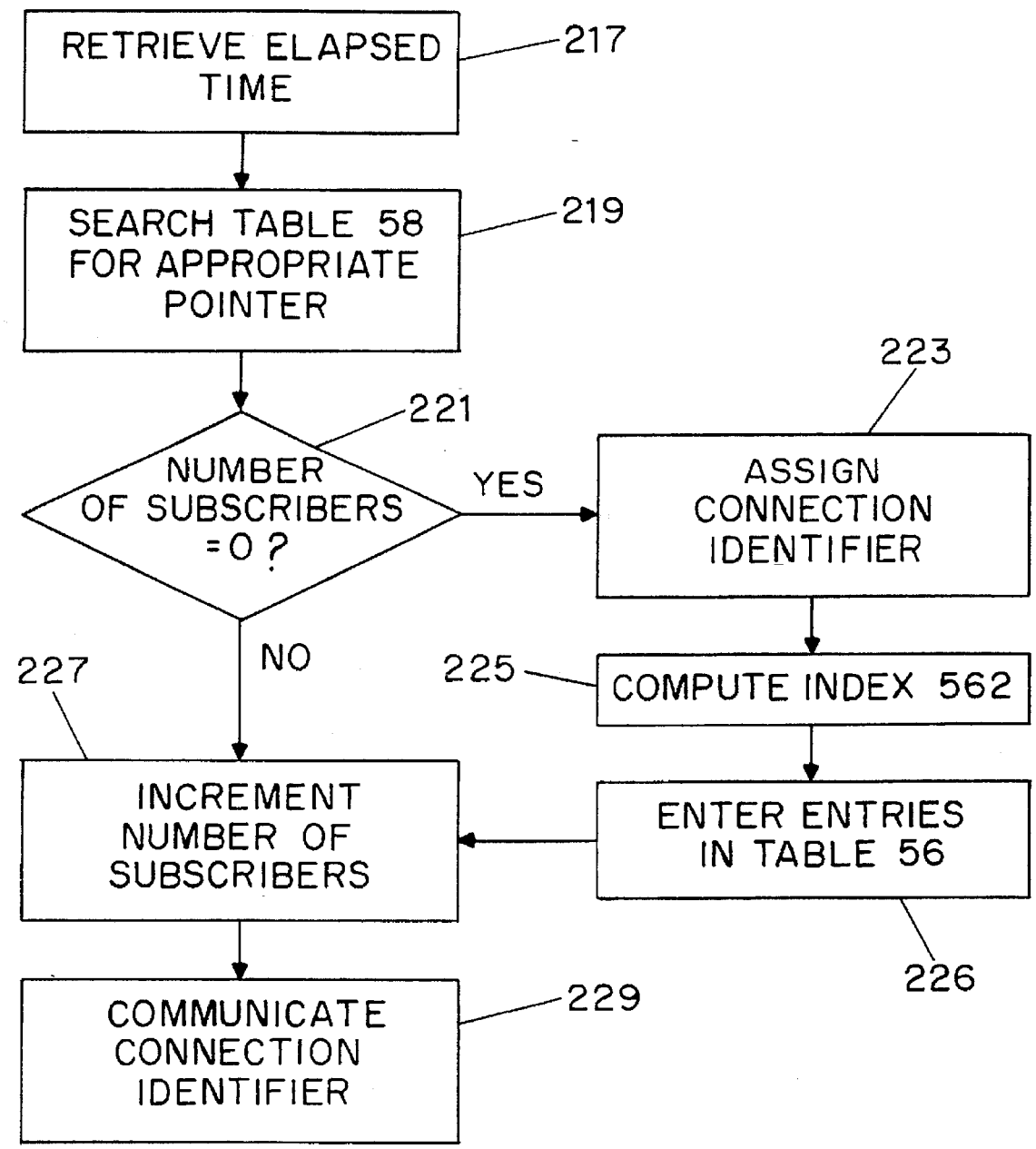
FIG. 21 is a flow chart depicting a subprocess for handling a restart request in the high-demand process.

The above elapsed time information is important for restarting the movie event after the pause when so requested by the subscriber. FIG. 21 is a flow chart depicting the restart subprocess within administrative process 5. Instructed by such a subprocess, multiprocessor 12 retrieves the elapsed movie time from database 9, as indicated at step 217. At step 219, multiprocessor 12 searches high-demand connection table 58 for a high-demand pointer with an appropriate start time or launch time. The latter is determined such that the play time associated with the pointer, which is defined to be the difference between the current time and the start time in question, is equal to or just smaller than the elapsed time. Multiprocessor 12 at step 221 determines whether the number of subscribers in column 583 associated with the pointer having the appropriate start time is zero. If such a number is zero (i.e., the pointer is inactive and has no connection identifier), multiprocessor 12 activates the pointer by allocating thereto a new connection identifier in column 580, as indicated at step 223. At step 225, multiprocessor 12 computes an index IND for column 562 of high-demand active table 56. The value of IND is determined as follows:

$$IND = INT(T_{elapsed}/T_{diff}); \qquad (d)$$

where $T_{elapsed}$ is the above elapsed time. Multiprocessor 12 proceeds to step 226 where it enters the computed index in column 562 and the new connection identifier in column 563 of Table 56. The number of subscribers in column 583 of table 58 is accordingly increased by one, as indicated at step 227. Returning briefly to step 221, if multiprocessor 12 determines that the number of subscribers is nonzero, it directly proceeds to step 227 just described. At step 229, multiprocessor 12 signals to the requesting terminal the connection identifier from column 580 of table 58. With the connection identifier, the requesting terminal restarts to receive the appropriate data stream from network 3 to continue with the movie event.

Based on the discussion heretofore, it should be apparent to a person skilled in the art that the above restart subprocess may easily be extended to allow a subscriber to randomly access the movie event at virtually any point. This is achieved by having, instead of server 11, the subscriber provide the elapsed time in the restart subprocess. Such self-defined elapsed time may be communicated to server 11 through the subscriber's terminal. Based on the received elapsed time, which can range from zero to the full duration of the movie, the restart subprocess enables the subscriber to freely access selected parts of the movie.

Figure 22:
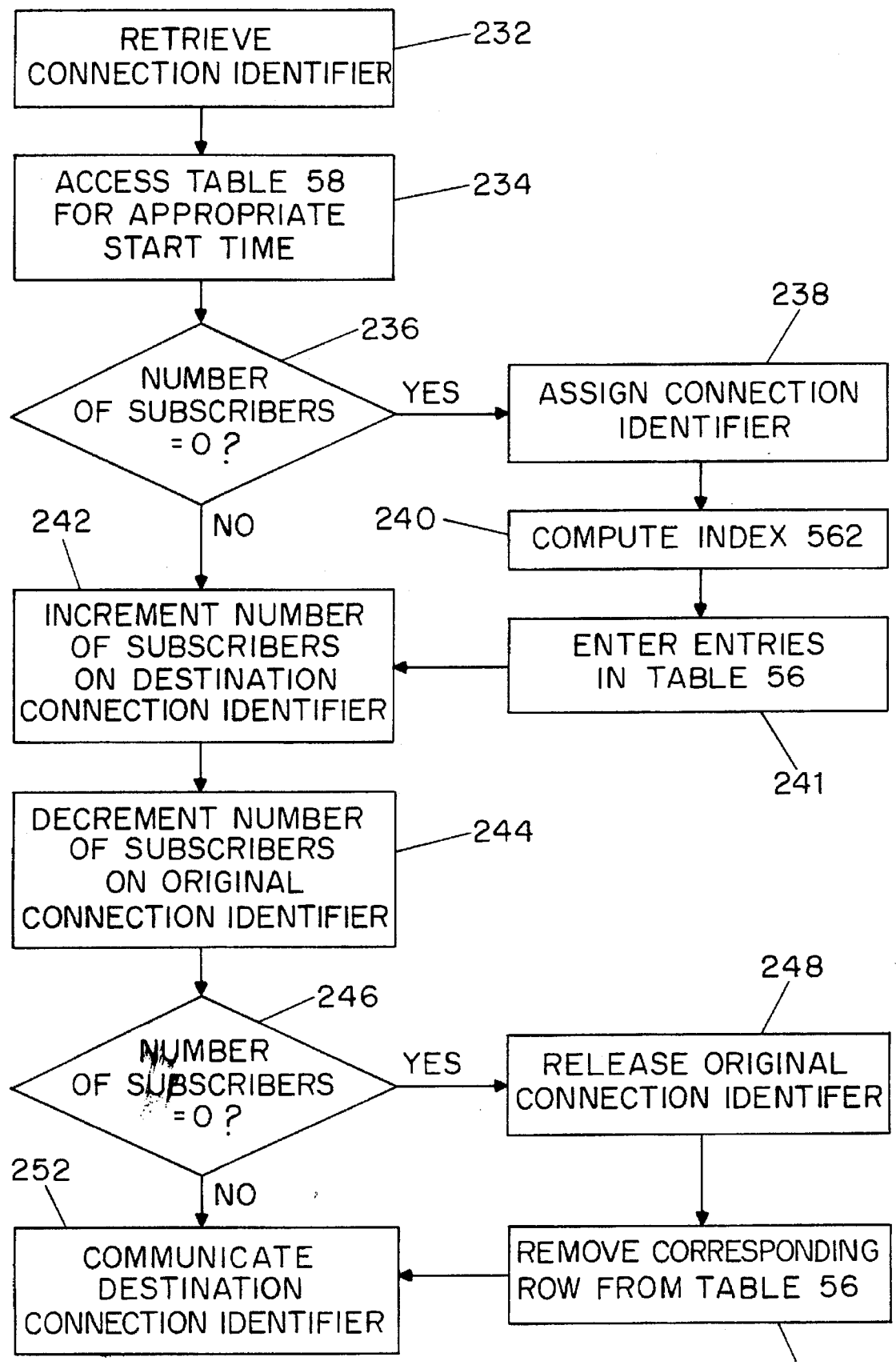
FIG. 22 is a flow chart depicting a subprocess for handling a fast-forwarding/rewinding request in the high-demand process.

The fast-forwarding/rewinding subprocess within administrative process 5 will now be described. Referring to FIG. 22, instructed by such a subprocess, multiprocessor 12 retrieves from database 9 the connection identifier identifying the data stream which is currently received by the subscriber's terminal requesting the fast-forwarding/rewinding operation, as indicated at step 232. Having learnt the current connection identifier, multiprocessor 12 at step 234 accesses high-demand connection table 58 for a destination connection identifier. The destination connection identifier identifying the desirable data stream that has a start time immediately before (fast-forwarding) or after (rewinding) that of the current data stream. At step 236, multiprocessor 12 determines whether the number of subscribers in column 583 associated with the destination data stream is zero. If this number is zero, multiprocessor 12 proceeds to step 238 where it allocates a new connection identifier as the destination connection identifier. Similar to step 225 previously described, multiprocessor 12 at step 240 computes an IND value for column 562 of high-demand active table 56 using above formula (d), with $T_{elapsed}$ being the difference between the current time and the desirable start time. Multiprocessor 12 then enters at step 241 the computed index in column 562 and the new connection identifier in column 563 of table 56. The number of subscribers entry in column 583 associated with the destination connection identifier is then increased by one, as indicated at step 242. The number of subscribers entry in column 583 associated with the current connection identifier is accordingly decreased by one, as indicated at step 244. Multiprocessor at step 246 determines whether the subscriber number associated with the current connection identifier is zero. If such a number is zero, the current connection identifier is released for later use, as indicated at step 248. As a result, the current data stream is disconnected and removed from network 3 to save the network bandwidth. Multiprocessor 12 then eliminates at step 250 the row having the released connection identifier from high-demand active table 56. At step 252, the subscriber's terminal is informed of the destination connection identifier identifying the data stream which the terminal receives as a result of the fast-forwarding/rewinding operation. Returning briefly to step 246, if the subscriber number is nonzero, multiprocessor 12 directly proceeds therefrom to step 252 just described. Returning further to step 236, if the number of subscribers associated with the destination connection identifier is nonzero, multiprocessor 12 directly proceeds therefrom to step 242 previously described. It is important to note that this fast-forwarding/rewinding subprocess can be repeatedly invoked by the subscriber's terminal, thereby allowing the subscriber to speed the movie forward or backward to a desirable point of the movie.

Figure 23:
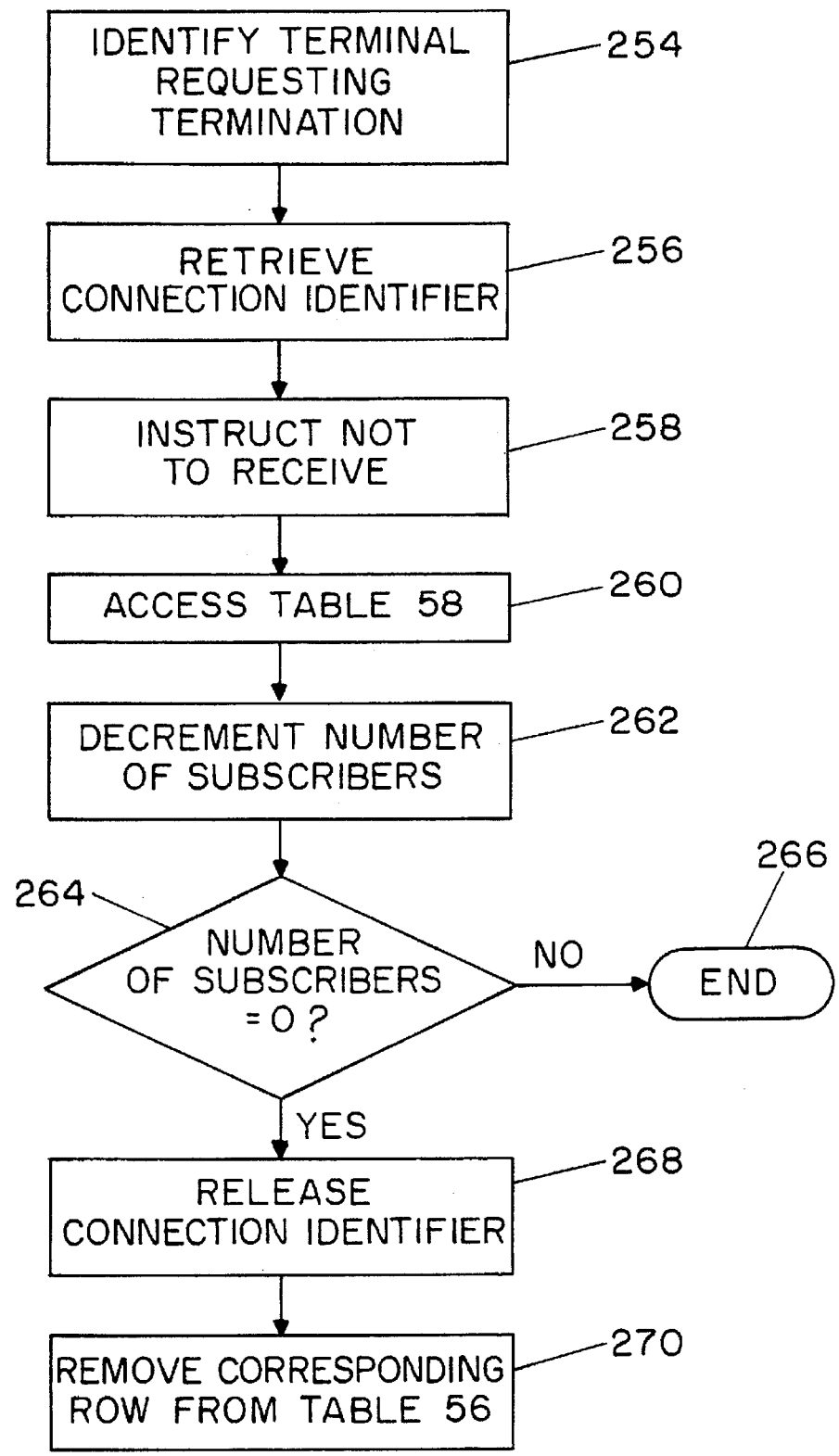
FIG. 23 is a flow chart depicting a subprocess for handling a service termination request in the high-demand process.

FIG. 23 is a flow chart depicting the subprocess within administrative process 5 for terminating service of a high-demand event. Instructed by such a subprocess, multiprocessor 12 identifies the subscriber's terminal requesting a termination based on the subscriber connection information in database 9, as indicated at step 254. Multiprocessor 12 also retrieves from database 9 the connection identifier identifying the data stream which is currently received by the terminal, as indicated at step 256. Multiprocessor 12 at step 258 communicates to the terminal to stop receiving any data stream and to display a predetermined screen which indicates the termination of the high-demand event. Such a predetermined screen is stored locally in the display buffer of the terminal. Multiprocessor 12 then proceeds to step 260 where it accesses high-demand connection table 58 for the row containing the retrieved connection identifier. Multiprocessor 12 causes the number of subscribers entry in column 583 in this row to be decreased by one, as indicated at step 262. Multiprocessor 12 determines at step 264 whether such a number has become zero. If this number is nonzero, the termination subprocess ends, as indicated at step 266. Otherwise, the subprocess proceeds to step 268 where the connection identifier is released and cleared from column 580. Multiprocessor 12 accordingly eliminates at step 270 from high-demand active table 56 the row containing the released connection identifier.

The aforementioned switching-on-the-fly operation switching multiple existing low-demand processes into a new high-demand process will now be described. It should be noted that a complete switching-on-the-fly operation need not be an instantaneous process. However, the low-demand processes are preferably switched unnoticeably to the subscribers. That is, among other things, the transition period for each switch needs to be negligible so as to avoid service disruption. Although it is acceptable to have each low-demand process switch at a different time, it is however desirable to minimize the total time of the switches.

Figure 24:
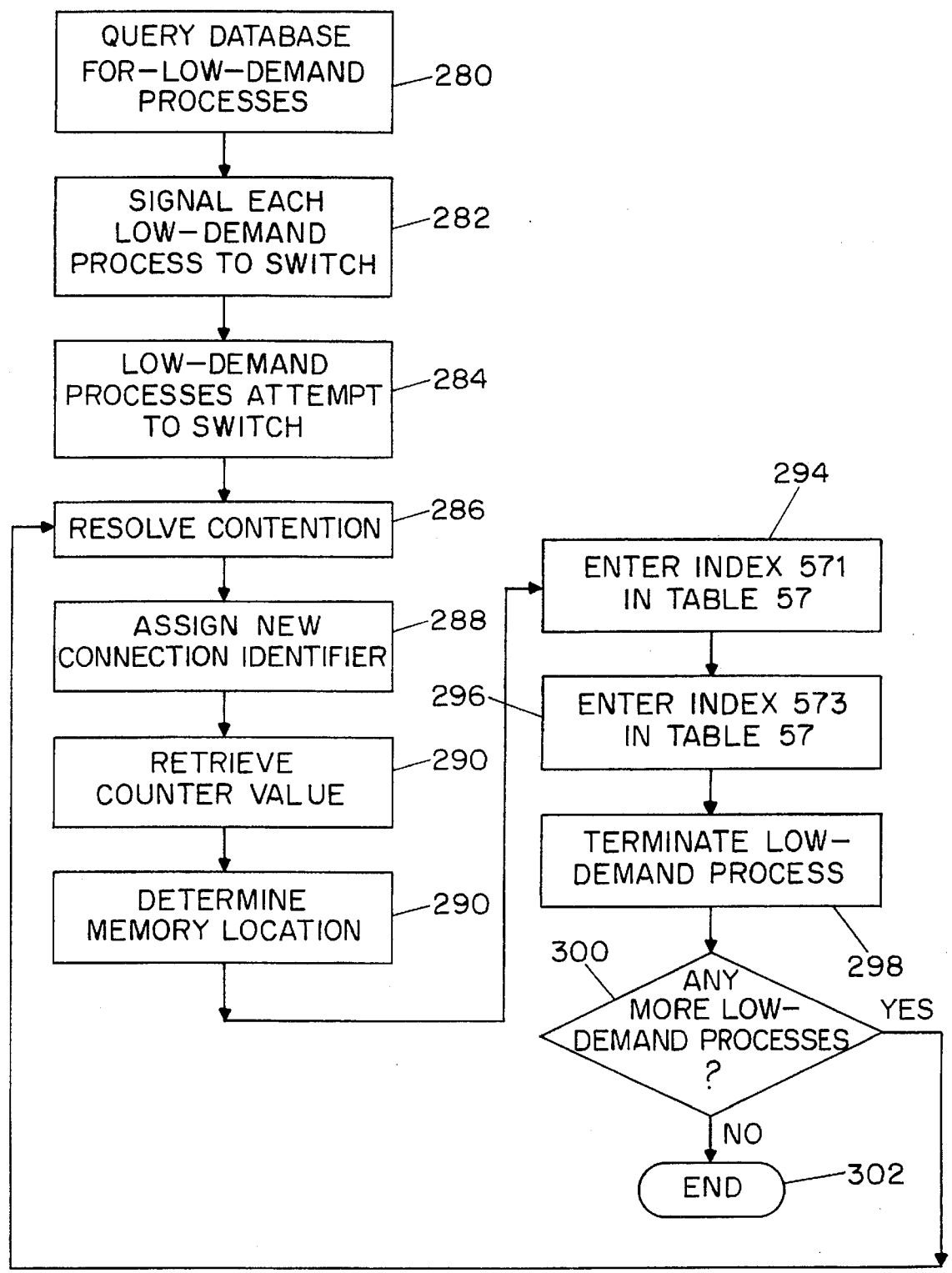
FIG. 24 is a flow chart depicting a switching-on-the-fly subprocess for switching a multiplicity of low-demand processes into a high-demand process in accordance with the invention.

FIG. 24 is a flow chart depicting the switching-on-the-fly subprocess within administrative process 5. Instructed by such a subprocess, multiprocessor 12 queries database 9 for all the low-demand processes serving the event which has been determined to be switched, as indicated at step 280. At step 282, multiprocessor 12 then signals to each of the identified low-demand processes to switch into the high-demand process which has been created in the above-described manner. In response, the low-demand processes attempt to switch into the new high-demand process, as indicated at step 284. As each low-demand process contends with other low-demand processes to switch, multiprocessor 12 at step 286 resolves the contention in accordance with a standard contention resolution scheme and converts one low-demand process at a time. The low-demand process which prevails is assigned a new low-demand pointer. This assignment involves creation of a new last row in low-demand active table 57. Thus, at step 288 multiprocessor 12 enters in column 575 in the last row a new connection identifier associated with the low-demand pointer. At step 290 multiprocessor 12 retrieves the counter value in the low-demand process and consults table of contents 55. Based on this counter value, multiprocessor 12 at step 292 determines the approximate memory location in memory space 110 of the movie content which the low-demand process is about to transmit, this memory location is expressed in terms of a base memory address in conjunction with a memory offset of table 55.

By way of example, let's say the counter value retrieved is 31. That is, the low-demand process has transmitted the first 31×500 Kbytes=15,500,000 bytes of the movie content, as each buffer in the low-demand process is 500 Kbytes long in this instance. Referring briefly to table 55, multiprocessor 12 first search through column 553 for a base memory address equal to or just smaller than 15500000. In this case, multiprocessor 12 determines that the base memory address 15000000 is just smaller than 15500000, and identifies the index number I associated with the base address to be 2. Multiprocessor 12 accordingly enters in column 571, the last row of table 57 the identified index number, as indicated at step 294. Multiprocessor 12 then subtracts the base address 15000000 from 15500000 and the result is 500000 or 500K. With this result, multiprocessor 12 further searches memory offset field 555 of table 55 along the row I=2 for an appropriate memory offset. The latter in this case must be equal to, or closest to but smaller than 500. Multiprocessor 12 determines that the entry in subcolumn 3 is 425 which is closest to but smaller than 500. This being so, multiprocessor 12 enters the subcolumn number as the index entry in column 573 and the last row of table 57, as indicated at step 296. The switch of the low-demand process into the high-demand process has been completed and multiprocessor 12 causes the low-demand process to terminate, as indicated at step 298. Multiprocessor 12 determines at step 300 whether any additional low-demand process needs to be converted. If it is determined that there are more low-demand processes to be converted, multiprocessor 12 returns to step 286 where another low-demand process is selected for conversion. Otherwise, the switch-on-the-fly subprocess comes to an end at step 302.

Unlike a high-demand pointer, the data stream associated with a low-demand pointer must be dedicated to only one subscriber, thus inefficiently committing a portion of the limited resources to such a subscriber. An effort is made here to diminish the number of low-demand pointers to efficiently utilize the resources. To this end, a subscriber served by a low-demand pointer is assigned to an appropriate, active high-demand pointer whenever such a subscriber requests a service alteration. For example, when the subscriber served by a low-demand pointer requests fast-forwarding, he/she is assigned to an active high-demand pointer at a higher memory address; the subscriber when requesting fast-forwarding is assigned to an active high-demand pointer at a lower memory address; and the subscriber when requesting a restart after pausing is assigned to an active high-demand pointer at a memory address which is closest to but lower than that of the low-demand pointer.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example, the high-demand pointers are separated by $T_{diff}$ which is illustratively 30 sec. in the present embodiment. Based on the discussion heretofore, it will be appreciated that one will reduce $T_{diff}$ to fine tune the service alteration in a high-demand process. That is, in the high-demand process one will reduce $T_{diff}$ to better the capabilities of fast-forwarding or rewinding to a desirable point of a movie, or restarting at virtually the same point where the movie has paused. In addition, the maximum wait time for the start of the movie will be reduced to the smaller $T_{diff}$.

Moreover, the term "data" used in the present disclosure broadly encompasses computer data, voice data, audio data, video data, text data, etc.

Finally, the exemplary embodiment of the invention is disclosed herein in a form in which the various multimedia functions are performed by discrete functional blocks. These functional blocks may be implemented in various ways and combinations using logic circuitry and/or appropriately programmed processors, as will be known to those skilled in the art.

We claim:

1. Apparatus for providing multimedia events comprising:

a memory for storing a plurality of data groups at different memory locations, said data groups representative of a selected multimedia event;

a processing element for retrieving data groups from said memory; and a transmitter for providing a plurality of data streams, each data stream representative of a version of the selected multimedia event starting at a different time; said processing element generating a plurality of pointers, each pointer being associated with a different data stream, each pointer indicating memory locations from where data groups are retrieved to form the data stream associated therewith.

2. The apparatus of claim 1 wherein a new pointer is generated every predetermined time period.

3. The apparatus of claim 2 wherein said new pointer when generated indicates a memory location where the first one of said data groups is stored.

4. The apparatus of claim 1 wherein each data stream is provided to at least one receiver capable of deriving the selected event from the data stream.

5. The apparatus of claim 1 wherein each memory location is identified by a base memory address and a memory offset.

6. The apparatus of claim 1 wherein said selected event is a movie event.

7. The apparatus of claim 6 wherein each data group contains data representative of a predetermined number of frames in the movie event.

8. The apparatus of claim 1 wherein each data stream is provided in an asynchronous transfer mode (ATM) format.

9. Apparatus for providing a selected multimedia event to a plurality of receivers comprising:

a transmitter for providing a plurality of data streams, each data stream representative of a version of said selected multimedia event having a different start time, number of the data streams provided being a function of number of versions of said selected multimedia event which are currently received by said receivers;

a processing element for assigning each data stream to at least one receiver; and a receptive element for receiving from a receiver at least a request for service alteration, said processing element responsive to said request for effecting said service alteration by at least removing from said receiver the assignment of the data stream assigned thereto.

10. The apparatus of claim 9 wherein said request is a request for fast-forwarding the selected event, and wherein said service alteration is effected by further assigning to said receiver a second data stream, said second data stream representative of a version of the selected event having an earlier start time than the data stream previously assigned to said receiver.

11. The apparatus of claim 9 wherein said request is a request for rewinding the selected event, and wherein said service alteration is effected by further assigning to said receivers a second data stream, said second data stream representative of a version of the selected event having a later start time than the data stream previously assigned to said receiver.

12. The apparatus of claim 9 wherein said request is a request for a pause during the selected event, and wherein said service alteration is effected by further recording a duration of said pause.

13. The apparatus of claim 9 wherein said request is a request for restarting the selected event after a pause during the selected event, and wherein said service alteration is effected by further assigning to said receiver a selected data stream, said selected data stream representative of a version of the selected event having a later start time than the data stream previously assigned to said receiver, said later start time being a function of a duration of said pause.

14. The apparatus of claim 9 wherein said selected event is a movie event.

15. The apparatus of claim 9 wherein each data stream is provided in an asynchronous transfer mode (ATM) format.

16. Apparatus for providing multimedia events to a plurality of receivers comprising:

a processing element, said processing element instructed by first instructions for performing a plurality of first processes to provide said receivers with a selected multimedia event;

a buffer element for storing, in each first process, first data partially representative of the selected event;

said processing element instructed by second instructions for performing a second process;

a memory for storing at a plurality of memory locations second data representative of the selected event in its entirety; said second process including reading said second data from said memory starting at different memory locations to provide a plurality of data streams; and a switching mechanism for switching said plurality of first processes into said second process upon detection of a predetermined condition, said switching mechanism including a mechanism for assigning said data streams to said receivers.

17. The apparatus of claim 16 wherein said buffer element includes two individual buffers, and wherein each first process includes writing ones of the first data to said buffer element, and reading the other ones of the first data from said buffer element, in such a way that while said ones of the first data is read from one of the buffers, said other ones of the first data is written to the other buffer.

18. The apparatus of claim 17 wherein said two individual buffers are equal in size.

19. The apparatus of claim 16 wherein said processing element generates a plurality of pointers, each pointer being associated with a different one of said data streams, each pointer indicating memory locations of said memory from where ones of said second data are read to form the data stream associated therewith.

20. The apparatus of claim 19 wherein each memory location is identified by a base memory address and a memory offset.

21. The apparatus of claim 16 wherein said predetermined condition is a function of limits of capacities of elements supporting said apparatus.

22. The apparatus of claim 21 connected to said receivers via a network, wherein said limits include limited bandwidth of said network.

23. The apparatus of claim 21 connected to a data storage device comprising said first data, wherein said limits include a limited rate of retrieval by said storage device of said first data.

24. The apparatus of claim 16 wherein said selected event is a movie event.

25. The apparatus of claim 24 wherein said second data is assembled in data groups each representative of a predetermined number of frames in the movie event.

26. The apparatus of claim 16 wherein each data stream is provided in an asynchronous transfer mode (ATM) format.

27. A system for providing multimedia events comprising:

a plurality of receivers; and a multimedia server comprising:

a memory for storing a plurality of data groups at different memory locations, said data groups representative of a selected multimedia event;

a processing element for retrieving data groups from said memory; and a transmitter for providing a plurality of data streams to said receivers, each data stream representative of a version of the selected multimedia event starting at a different time;

each receiver receiving one of said plurality of data streams, and deriving the selected event from the received data stream; said processing element in said multimedia server generating a plurality of pointers, each pointer being associated with a different data stream, each pointer indicating memory locations from where data groups are retrieved to form the data stream associated therewith.

28. The system of claim 27 wherein a new pointer is generated every predetermined time period.

29. The system of claim 27 wherein said new pointer when generated indicates a memory location where the first one of said data groups is stored.

30. The system of claim 27 wherein each memory location is identified by a base memory address and a memory offset.

31. The system of claim 27 wherein each receiver is connected to the transmitter through a communications network.

32. The system of claim 31 wherein said communications network is a broadband network.

33. The system of claim 27 wherein each data stream is provided in an asynchronous transfer mode (ATM) format.

34. The system of claim 27 wherein each receiver is capable of generating at least a request for service alteration, said processing element effecting said service alteration in response to said request.

35. The system of claim 34 wherein said request is a request for fast-forwarding the selected event, said processing element causing a receiver requesting the fast-forwarding, which said receiver is currently receiving a selected data stream, to receive a second data stream, said second data stream representative of a version of the selected event having an earlier start time than said selected data stream.

36. The system of claim 34 wherein said request is a request for rewinding the selected event, said processing element causing a receiver requesting the rewinding, which said receiver is currently receiving a selected data stream, to receive a second data stream, said second data stream representative of a version of the selected event having a later start time than said selected data stream.

37. The system of claim 34 wherein said request is a request for a pause during the selected event, said processing element causing a receiver requesting said pause, which said receiver is currently receiving a selected data stream, to stop receiving said selected data stream, and causing recordation of a duration of said pause.

38. The system of claim 34 wherein said request is a request for restarting the selected event after a pause during the selected event, said processing element causing a receiver requesting the restart to receive a selected data stream, said selected data stream representative of a version of the selected event having a later start time than the last data stream which said receiver received, said later start time being a function of a duration of said pause.

39. The system of claim 27 wherein said selected event is a movie event.

40. The system of claim 39 wherein each data group contains data representative of a predetermined number of frames in the movie event.

41. A method for providing multimedia events comprising the steps of:

storing a plurality of data groups at different memory locations in a memory, said data groups representative of a selected multimedia event;

retrieving data groups from said memory;

providing a plurality of data streams; each data stream representative of a version of the selected multimedia event starting at a different time; and generating a plurality of pointers, each pointer being associated with a different data stream, each pointer indicating memory locations from where data groups are retrieved to form the data stream associated therewith.

42. The method of claim 41 wherein a new pointer is generated every predetermined time period.

43. The method of claim 42 wherein said new pointer when generated indicates a memory location where the first one of said data groups is stored.

44. The method of claim 41 wherein each data stream is provided to at least one receiver capable of deriving the selected event from the data stream.

45. The method of claim 41 wherein each memory location is identified by a base memory address and a memory offset.

46. The method of claim 41 wherein said selected event is a movie event.

47. The method of claim 46 wherein each data group contains data representative of a predetermined number of frames in the movie event.

48. The method of claim 41 wherein each data stream is provided in an asynchronous transfer mode (ATM) format.

49. A method for providing a selected multimedia event to a plurality of receivers comprising the steps of:

providing a plurality of data streams, each data stream representative of a version of said selected multimedia event having a different start time, number of said data streams being a function of number of versions of said selected multimedia event which are currently received by said receivers;

assigning each data stream to at least one receiver;

receiving from a receiver at least a request for service alteration; and effecting said service alteration in response to said request, the effecting step including the step of removing from said receiver the assignment of the data stream assigned thereto.

50. The method of claim 49 wherein said request is a request for fast-forwarding the selected event, and wherein said effecting step further includes the step of assigning to said receiver a second data stream, said second data stream representative of a version of the selected event having an earlier start time than the data stream previously assigned to said receiver.

51. The method of claim 49 wherein said request is a request for rewinding the selected event, and wherein said effecting step further includes the step of assigning to said receiver a second data stream, said second data stream representative of a version of the selected event having a later start time than the data stream previously assigned to said receiver.

52. The method of claim 49 wherein said request is a request for a pause during the selected event, and wherein said effecting step further includes the step of recording a duration of said pause.

53. The method of claim 49 wherein said request is a request for restarting the selected event after a pause during the selected event, and wherein said effecting step further includes the step of assigning to said receiver a selected data stream, said selected data stream representative of a version of the selected event having a later start time than the last data stream which said receiver received, said later start time being a function of a duration of said pause.

54. The method of claim 49 wherein said selected event is a movie event.

55. The method of claim 49 wherein each data stream is provided in an asynchronous transfer mode (ATM) format.

56. A method for providing multimedia events to a plurality of receivers comprising:

a first step of performing a plurality of first processes to provide said receivers with a selected multimedia event, said first step including the step of storing, in each first process, first data partially representative of the selected event in a buffer element;

a second step of performing a second process, said second step further comprising the steps of:

storing, in a memory, at a plurality of memory locations second data representative of the selected event in its entirety; and reading said second data from said memory starting at different memory locations to provide a plurality of data streams; and a third step of switching said plurality of first processes into said second process upon detection of a predetermined condition, said switching step including the step of assigning said data streams to said receivers.

57. The method of claim 56 wherein said buffer element includes two individual buffers, and wherein said first step further includes the steps of writing ones of the first data to said buffer element, and reading the other ones of the first data from said buffer element, in such a way that while said ones of the first data is read from one of the buffers, said other ones of the first data is written to the other buffer.

58. The method of claim 57 wherein said two individual buffers are equal in size.

59. The method of claim 56 further comprising the step of generating a plurality of pointers, each pointer being associated with a different one of said data streams, each pointer indicating memory locations of said memory where ones of said second data are read to form the data stream associated therewith.

60. The method of claim 59 wherein each memory location is identified by a base memory address and a memory offset.

61. The method of claim 56 wherein said predetermined condition is a function of limits of capacities of elements supporting said apparatus.

62. The method of claim 61 wherein said limits include limited bandwidth of a network connecting said receivers.

63. The method of claim 61 wherein said limits include a limited rate of retrieval of said first data from a storage device comprising said first data.

64. The method of claim 56 wherein said selected event is a movie event.

65. The method of claim 64 wherein said second data is assembled in data groups each representative of a predetermined number of frames in the movie event.

66. The method of claim 56 wherein each data stream is provided in an asynchronous transfer mode (ATM) format.

67. A method for use in a system for serving multimedia events, said system comprising a plurality of receivers, said method comprising the steps of:

storing in a memory a plurality of data groups at different memory locations, said data groups representative of a selected multimedia event;

retrieving data groups from said memory;

providing a plurality of data streams to said receivers, each data stream representative of a version of the selected multimedia event starting at a different time;

receiving in each receiver one of said plurality of data streams;

deriving in each receiver the selected event from the received data stream; and generating a plurality of pointers, each pointer being associated with a different data stream, each pointer indicating memory locations from where data groups are retrieved to form the data stream associated therewith.

68. The method of claim 67 wherein a new pointer is generated every predetermined time period.

69. The method of claim 67 wherein said new pointer when generated indicates a memory location where the first one of said data groups is stored.

70. The method of claim 67 wherein each memory location is identified by a base memory address and a memory offset.

71. The method of claim 67 wherein each data stream is provided in an asynchronous transfer mode (ATM) format.

72. The method of claim 67 further comprising the steps of generating in a receiver at least a request for service alteration, and effecting said service alteration in response to said request.

73. The method of claim 72 wherein said request is a request for fast-forwarding the selected event, and wherein said effecting step includes the step of causing said receiver, which is currently receiving a selected data stream, to receive a second data stream, said second data stream representative of a version of the selected event having an earlier start time than said selected data stream.

74. The method of claim 72 wherein said request is a request for rewinding the selected event, and wherein said effecting step includes the step of causing said receiver, which is currently receiving a selected data stream, to receive a second data stream, said second data stream representative of a version of the selected event having a later start time than said selected data stream.

75. The method of claim 72 wherein said request is a request for a pause during the selected event, and wherein said effecting step includes the step of causing said receiver, which is currently receiving a selected data stream, to stop receiving said selected data stream, and the step of recording a duration of said pause.

76. The method of claim 72 wherein said request is a request for restarting the selected event after a pause during the selected event, and wherein said effecting step includes the step of causing said receiver to receive a selected data stream, said selected data stream representative of a version of the selected event having a later start time than the last data stream which said receiver received, said later start time being a function of a duration of said pause.

77. The method of claim 67 wherein said selected event is a movie event.

78. The method of claim 77 wherein each data group contains data representative of a predetermined number of frames in the movie event.

* * * * *

UNITED STATES PATENT AND TRADEMARK OFFICE
CERTIFICATE OF CORRECTION

PATENT NO. : 5,629,732

DATED : May 13, 1997

INVENTOR(S) : Allen S. Moskowitz et al.

It is certified that error appears in the above-identified patent and that said Letters Patent is hereby corrected as shown below:

Title
page, last line of ABSTRACT, "by way" should read -- by way of --. Col. 10, line 35, "move" should read -- moves --. Col. 12, line 48, $j_{th}$ should read -- $j^{th}$ --. Col. 19, line 2, "search" should read -- searches --. Col. 20, line 64, "receivers" should read -- receiver --. Col. 21, lines 43 and 44, "is" should read -- are --. Col. 24, lines 47 and 48, "is" should read -- are --.

Signed and Sealed this

Twenty-first Day of October 1997

*Attest:*

BRUCE LEHMAN

*Attesting Officer*   *Commissioner of Patents and Trademarks*